(12) United States Patent
Chen et al.

(10) Patent No.: US 9,676,441 B2
(45) Date of Patent: Jun. 13, 2017

(54) AUTOMATIC SHOCK ABSORBER SYSTEM FOR BICYCLE

(71) Applicant: GIANT MANUFACTURING CO. LTD., Taichung Hsien (TW)

(72) Inventors: Chien-Hung Chen, Miaoli County (TW); Min-Chang Chen, Taichung (TW); Chung-Wei Lin, Taichung (TW)

(73) Assignee: GIANT MANUFACTURING CO. LTD, Taichung (TW)

( * ) Notice: Subject to any disclaimer, the term of this patent is extended or adjusted under 35 U.S.C. 154(b) by 100 days.

(21) Appl. No.: 14/534,152

(22) Filed: Nov. 5, 2014

(65) Prior Publication Data

US 2015/0130153 A1    May 14, 2015

(30) Foreign Application Priority Data

Nov. 12, 2013  (TW) .............................. 102141089 A
Jul. 31, 2014   (TW) .............................. 103126190 A

(51) Int. Cl.
| | | |
|---|---|---|
| *B60G 7/00* | (2006.01) | |
| *B62K 25/04* | (2006.01) | |
| *B60G 17/016* | (2006.01) | |
| *B60G 17/0165* | (2006.01) | |
| *B60G 17/06* | (2006.01) | |

(52) U.S. Cl.
CPC ............ *B62K 25/04* (2013.01); *B60G 17/016* (2013.01); *B60G 17/0165* (2013.01); *B60G 17/06* (2013.01); *B60G 2300/12* (2013.01); *B62K 2025/044* (2013.01)

(58) Field of Classification Search
CPC ........ B62K 23/02; B62K 23/06; B62K 23/08; B62K 2207/00; B62D 17/00; B60K 26/02
USPC .... 280/124.108, 124.157, 124.158; 180/218, 180/219, 227
See application file for complete search history.

(56) References Cited

U.S. PATENT DOCUMENTS

| | | | |
|---|---|---|---|
| 4,881,750 A | 11/1989 | Hartmann | |
| 5,217,246 A | 6/1993 | Williams | |
| 5,445,401 A | 8/1995 | Bradbury | |
| 5,456,480 A | 10/1995 | Turner | |
| 5,509,677 A | 4/1996 | Bradbury | |
| 5,975,225 A | 11/1999 | Kamen | |
| 6,026,939 A | 2/2000 | Girvin et al. | |
| 6,149,174 A | 11/2000 | Bohn | |
| 7,128,192 B2 * | 10/2006 | Fox ........................ | B62K 25/04 188/266.2 |
| 7,350,787 B2 | 4/2008 | Voss | |
| 8,286,982 B2 | 10/2012 | Plantet | |
| 8,403,092 B1 * | 3/2013 | Trethewey ........... | B62K 25/283 180/227 |
| 8,825,322 B1 | 9/2014 | Ikemoto | |
| 2002/0180166 A1 * | 12/2002 | Voss ........................ | B62J 99/00 280/5.5 |
| 2006/0064223 A1 * | 3/2006 | Voss ........................ | B62K 25/04 701/52 |

(Continued)

*Primary Examiner* — Toan To
(74) *Attorney, Agent, or Firm* — Vierra Magen Marcus LLP

(57) ABSTRACT

An automatic control shock absorber system for a bicycle is provided. The system includes one or more sensors. A controller outputs a control signal to a damping adjuster according to the one or more sensors, such that the damping adjuster controls level of damping force based on the sensors.

23 Claims, 35 Drawing Sheets

(56) References Cited

U.S. PATENT DOCUMENTS

| | | | | |
|---|---|---|---|---|
| 2009/0088934 | A1* | 4/2009 | Takebayashi | B62J 99/00 701/51 |
| 2010/0276906 | A1* | 11/2010 | Galasso | B60G 15/12 280/283 |
| 2011/0012317 | A1* | 1/2011 | Mouri | B62K 25/08 280/5.519 |
| 2011/0095507 | A1* | 4/2011 | Plantet | B62K 25/08 280/277 |
| 2011/0109060 | A1* | 5/2011 | Earle | B62K 25/28 280/283 |
| 2011/0202236 | A1* | 8/2011 | Galasso | B62K 25/04 701/37 |
| 2012/0253599 | A1* | 10/2012 | Shirai | B62K 25/04 701/37 |
| 2014/0316652 | A1* | 10/2014 | Ericksen | F16F 9/512 701/37 |
| 2015/0081171 | A1* | 3/2015 | Ericksen | B60G 17/016 701/37 |

* cited by examiner

AUTOMATIC SHOCK ABSORBER SYSTEM FOR BICYCLE

CROSS REFERENCE TO RELATED APPLICATIONS

This application claims the priority benefit of Taiwan Application Serial No. 102141089, filed on Nov. 12, 2013 and Taiwan Application Serial No. 103126190, filed on Jul. 31, 2014. The entirety of the two above-mentioned patent application is hereby incorporated by reference herein in their entirety.

BACKGROUND

Field

The technology described herein relates to a vehicle suspension system, and particularly relates to an automatic control shock absorber system for a bicycle.

Description of the Related Art

The conventional suspension control method for a bicycle makes use of a shock signal of a front wheel to open or switch a valve of a shock absorber, or uses shock acceleration of the front wheel to determine bumpiness of pavements, thereby controlling the valve of the shock absorber and thus adjusting the shock absorbing ability and reacting speed of the shock absorber.

However, an issue set forth in the following may arise in the conventional technology of shock absorber adjustment. Namely, when the shock signal of the front wheel is generated, the shock absorber coupled with the signal needs to react within a very short time, or the shock absorber does not function as it is supposed to. Also, generally speaking, when the front wheel takes the shock, the front shock absorber also takes the shock simultaneously. Thus, under the circumstance that the control is based on the shock signal of the front wheel, the front shock absorber is only able to make corresponding adjustments and control when taking the next shock. Accordingly, the front shock absorber is not able to make a timely adjustment, making the front and rear shock absorber not coordinated properly.

Moreover, the front wheel of a bicycle has a turning function, and riding a bicycle in the mountain is not as stable as driving a four-wheel vehicle. Besides, there is no consistent pattern for judgments in the signals received and in actual bicycle-riding in the wild, and the signals received need some time to be analyzed. Thus, in a complicated pavement condition, it is almost impossible for a control mechanism to correspond to the condition simultaneously. Accordingly, the method using the acceleration of the front wheel to detect the bumpiness of the pavement does not yield a preferable result.

SUMMARY

An automatic control shock absorber system for a bicycle is proposed that is capable of automatically adjusting a damping force of a shock absorber to improve a pedaling efficiency.

One embodiment of an automatic control shock absorber system for a bicycle includes a pedaling cadence sensor, a signal receiver, a controller, and a damping adjuster. The pedaling cadence sensor is configured to detect a pedaling cadence of the bicycle and output a pedaling signal. The signal receiver is coupled to the pedaling cadence sensor to receive the pedaling signal. The controller is coupled to the signal receiver and outputs a level control signal according to the pedaling signal. The damping adjuster is coupled to the controller and adjusts a level of a damping force according to the level control signal.

According to an embodiment, the automatic control shock absorber system for the bicycle further includes a posture sensor. The posture sensor is coupled to the controller and is configured to detect a posture of a rider when riding the bicycle and output a posture signal. The controller determines a relational curve of damping according to the posture signal, and outputs the level control signal according to the pedaling signal based on the relational curve of damping.

According to an embodiment, the pedaling cadence sensor is disposed at one of a chain ring, a crank arm, a crank spindle, a pedal, and a frame of the bicycle, or is disposed at a leg of the rider. The posture sensor may be disposed at a position such as a saddle, a saddle post, a grip, a bicycle handle, a handle stem, a pedal, a frame, a front fork, a rear shock absorber, a hub, a crank spindle, and the controller.

According to an embodiment, the damping force is positively correlated with the pedaling cadence. In addition, as the pedaling cadence increases, the damping force may also increase in a stepwise manner. The relational curve of damping is one of a relational curve for a sitting posture and a relational curve for a standing posture, and a slope of curve of the relational curve for the standing posture is steeper than a slope of curve of the relational curve for the sitting posture.

According to an embodiment, the automatic control shock absorber system for the bicycle further includes a slope sensor detecting a slope of a location of the bicycle and outputting a slope signal. In addition, the controller determines the relational curve of damping according to the posture signal and the slope signal, and outputs the level control signal according to the pedaling signal based on the relational curve of damping.

According to an embodiment, the controller controls compression damping, rebound damping, and a tire pressure. In addition, the bicycle further includes a front fork shock absorber or a rear shock absorber, or includes the front fork shock absorber and the rear shock absorber at the same time. Each of the front fork shock absorber and the rear shock absorber includes the damping adjuster. The controller may individually controls the front fork shock absorber or the rear shock absorber or controls the front fork shock absorber and the rear shock absorber at the same time.

According to an embodiment, the pedaling cadence is obtained from one of a plurality of information generated by sensing the chain ring, the crank arm, the crank spindle, or the pedal. The information are, for example, revolutions per minute (RPM), an angular velocity (radian per second), or a variation frequency of pedaling power, pedaling force, or pedaling torque.

According to an embodiment, the automatic control shock absorber system for the bicycle further includes a power sensor obtaining a power based on the pedaling torque and the angular velocity, so as to further adjust the level of the damping force based on the power.

An automatic control shock absorber system for a bicycle includes a posture sensor, detecting a posture of a rider when riding the bicycle and outputting a posture signal; a signal receiver, coupled to the posture sensor to receive the posture signal; a controller, coupled to the signal receiver and outputting a level control signal according to the posture signal; and a damping adjuster, coupled to the controller and adjusting a level of a damping force according to the level control signal.

According to an embodiment, the automatic control shock absorber system for the bicycle further includes a pedaling cadence sensor coupled to the controller, detecting a pedaling cadence of the bicycle, and outputting a pedaling signal. The controller determines a relational curve of damping according to the posture signal, and outputs the level control signal according to the pedaling signal based on the relational curve of damping.

According to an embodiment, the relational curve of damping is one of a relational curve for a sitting posture or a relational curve for a standing posture, and a slope of curve of the relational curve for the standing posture is steeper than a slope of curve of the relational curve for the sitting posture. The damping force is positively correlated with the pedaling cadence, or the damping force increases in a stepwise manner as the pedaling cadence increases.

Based on the above, the system is capable of adjusting characteristics of the shock absorber in correspondence with different external factors, so as to improve the pedaling efficiency.

An automatically adjusting damping system for a bicycle includes a vibration sensor, a pedaling cadence sensor, a posture sensor, a signal receiver, a damping adjuster, and a controller. The vibration sensor detects vibration of the bicycle and outputs a vibration signal. The pedaling cadence sensor is configured to detect a pedaling cadence of the bicycle and output a pedaling signal. The posture sensor is configured to detect a posture that a rider adopts when riding the bicycle and output a corresponding posture signal. The signal receiver is coupled to the vibration sensor, the pedaling cadence sensor, and the posture sensor to receive the vibration signal, the cadence pedaling signal, and the posture signal. The damping adjuster is configured to adjust a level of a damping force. The controller is coupled to the signal receiver and the damping adjuster. The controller calculates and transmits a level control signal to the damping adjuster, such that the damping adjuster adjusts the level of the damping force according to the level control signal.

According to one embodiment, the vibration sensor is a gravity sensor, and a threshold gravity value is set. When a gravity value sensed by the gravity sensor is lower than the threshold gravity value for a predetermined time, the controller makes the damping adjuster adjust the level of the damping force to a minimal damping level.

According to an embodiment, the controller calculates a vibration parameter within a predetermined time interval according to the vibration signal. When the vibration parameter is higher, the level of the damping force is adjusted to be lower, while when the vibration parameter is lower, the level of the damping force is adjusted to be higher.

According to an embodiment, the controller determines an initial damping level according to the pedaling signal and the posture signal and determines whether the vibration parameter is greater than a vibration threshold value, and when the vibration parameter is not greater than the vibration threshold value, the damping adjuster sets the level of the damping force at a first damping level, while when the vibration parameter is greater than the vibration threshold value, the damping adjuster sets the level of the damping force at a second damping level, the first damping level being higher than the second damping level, and the second damping level being the initial damping level.

According to an embodiment, the automatically adjusting damping system for the bicycle further includes a slope sensor. The slope sensor is coupled to the signal receiver, detects whether a slope of a current location of the bicycle indicates uphill, and outputs a corresponding slope signal. The controller determines an initial damping level according to the pedaling signal, the posture signal, and the slope signal, and determines whether the vibration parameter is greater than a vibration threshold value, and when the vibration parameter is not greater than the vibration threshold value, the damping adjuster sets the level of the damping force at a first damping level, while when the vibration parameter is greater than the vibration threshold value, the damping adjuster sets the level of the damping force at a second damping level, the first damping level being higher than the second damping level, and the second damping level being the initial damping level.

An automatically adjusting damping system for a bicycle includes a vibration sensor, a signal receiver, a damping adjuster, and a controller. The vibration sensor detects vibration of the bicycle and outputs a vibration signal. The signal receiver is coupled to the vibration sensor to receive the vibration signal. The damping adjuster is configured to adjust a level of a damping force. The controller is coupled to the signal receiver and the damping adjuster. The controller calculates a vibration parameter within a predetermined time interval according to the vibration signal to output a level control signal corresponding to the vibration parameter to the damping adjuster, such that the damping adjuster adjusts the level of the damping force according to the level control signal.

According to an embodiment, when the vibration parameter is higher, the level of the damping force is adjusted to be lower, while when the vibration parameter is lower, the level of the damping force is adjusted to be higher.

According to an embodiment, the controller determines whether the vibration parameter is greater than a vibration threshold value, and when the vibration parameter is not greater than the vibration threshold value, the damping adjuster sets the level of the damping force at a first damping level, while when the vibration parameter is greater than the vibration threshold value, the damping adjuster sets the level of the damping force at a second damping level, the first damping level being higher than the second damping level.

According to an embodiment, the automatically adjusting damping system for the bicycle further includes a pedaling cadence sensor. The pedaling cadence sensor is coupled to the signal receiver and is configured to detect a pedaling cadence of the bicycle and output a pedaling signal. Here, the controller determines an initial damping level according to the pedaling signal. In addition, the controller determines whether the vibration parameter is greater than the vibration threshold value. When the vibration parameter is not greater than the vibration threshold value, the damping adjuster sets the level of the damping force at a first damping level. When the vibration parameter is greater than the vibration threshold value, the damping adjuster sets the level of the damping force at a second damping level. The first damping level is higher than the second damping level, and the second damping level is the initial damping level.

According to an embodiment, the automatically adjusting damping system for the bicycle further includes a posture sensor. The posture sensor is coupled to the signal receiver, detects whether a posture that a rider adopts when riding the bicycle is a standing pedaling posture or a sitting pedaling posture, and outputs a corresponding posture signal, such that the controller sets a first vibration threshold value or a second vibration threshold value according to the posture signal. When the standing pedaling posture is adopted, the controller determines whether the vibration parameter is greater than the first vibration threshold value, and when the vibration parameter is not greater than the first vibration threshold value, the damping adjuster sets the level of the damping force at a first damping level, while when the vibration parameter is greater than the first vibration threshold value, the damping adjuster sets the level of the damping force at a second damping level. In addition, the first damping level is higher than the second damping level. When the sitting pedaling posture is adopted, the controller determines whether the vibration parameter is greater than the second vibration threshold value, and when the vibration parameter is not greater than the second vibration threshold value, the damping adjuster sets the level of the damping force at a third damping level, while when the vibration parameter is greater than the second vibration threshold value, the damping adjuster sets the level of the damping force at a fourth damping level. In addition, the third damping level is higher than the fourth damping level, the third damping level is lower than the first damping level, and the fourth damping level is lower than the second damping level.

According to an embodiment, the automatically adjusting damping system for the bicycle further includes a slope sensor. The slope sensor is coupled to the signal receiver, detects whether a slope of a current location of the bicycle indicates uphill, and outputs a corresponding slope signal, such that the controller sets a first vibration threshold value or a second vibration threshold value according to the slope signal. When the slope indicates the location is uphill, the controller determines whether the vibration parameter is greater than the first vibration threshold value, and when the vibration parameter is not greater than the first vibration threshold value, the damping adjuster sets the level of the damping force at a first damping level, while when the vibration parameter is greater than the first vibration threshold value, the damping adjuster sets the level of the damping force at a second damping level. In addition, the first damping level is higher than the second damping level. When the slope indicates that the location is not uphill, the controller determines whether the vibration parameter is greater than the second vibration threshold value, and when the vibration parameter is not greater than the second vibration threshold value, the damping adjuster sets the level of the damping force at a third damping level, while when the vibration parameter is greater than the second vibration threshold value, the damping adjuster sets the level of the damping force at a fourth damping level. In addition, the third damping level is higher than the fourth damping level, the third damping level is lower than the first damping level, and the fourth damping level is lower than the second damping level.

Based on the above, automatically adjusting the level of the damping force according to the sensed information described above allows the user not to pay attention to controlling switching of the level of the damping force. Therefore, the pedaling efficiency is improved, and riding becomes safer as well.

DETAILED DESCRIPTION

Generally speaking, when pedaling a bicycle, vertical movements of a center of gravity of a rider may cause unnecessary compression of a shock absorber of the bicycle. As a result, a pedaling efficiency of the rider may be reduced. In addition, different pedaling cadences may generate different amplitudes and frequencies to the shock absorber. Thus, the technology disclosed herein provides an automatic control shock absorber system for a bicycle capable of adjusting characteristics of the shock absorber in correspondence with different external factors, so as to improve the pedaling efficiency.

Generally speaking, comfort and efficiency both need to be taken into account when it comes to bicycle riding. By adjusting a damper to be softer, it becomes more comfortable to ride, but a pedaling efficiency is lower. If the damper is adjusted to be firmer, the pedaling efficiency is improved, but it becomes less comfortable. In some embodiments of the system disclosed herein, an algorithm is implemented to calculate vibration of a body of the bicycle within a time period, so as to automatically adjust a level of a damping force based on the vibration of the bicycle itself, thereby improving the pedaling efficiency and preventing the damper from functioning erroneously.

Figure 1:
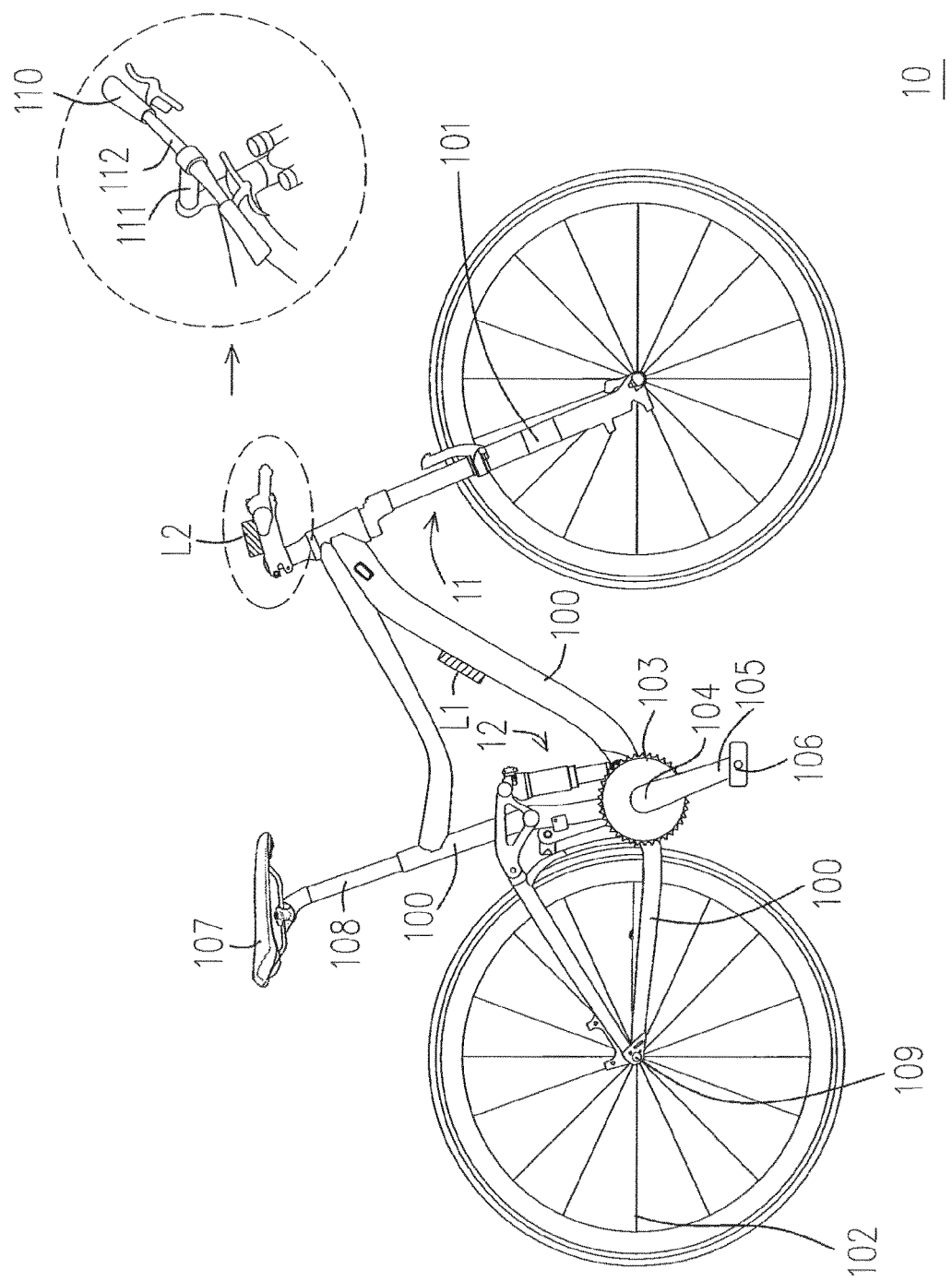
FIG. 1 is a schematic view illustrating a bicycle.

FIG. 1 is a schematic view illustrating a bicycle. Referring to FIG. 1, a bicycle 10 includes a frame 100, a front fork 101, a chain ring 103, a crank spindle 104, a crank arm 105, a pedal 106, a saddle 107, a saddle post 108, a hub (i.e. a shaft at the center of a wheel) 109, a grip 110, a handle stem 111, and a bicycle handle 112. In this embodiment, the bicycle 10 also includes a front fork shock absorber 11 (disposed at the front fork 101) and a rear shock absorber 12. However, in other embodiments, it is possible that only one of the front fork shock absorber 11 and the rear shock absorber 12 is disposed in the bicycle 10. In the following, an automatic control shock absorber system for a bicycle is described by taking the bicycle 10 as an example.

First Embodiment

Figure 2:
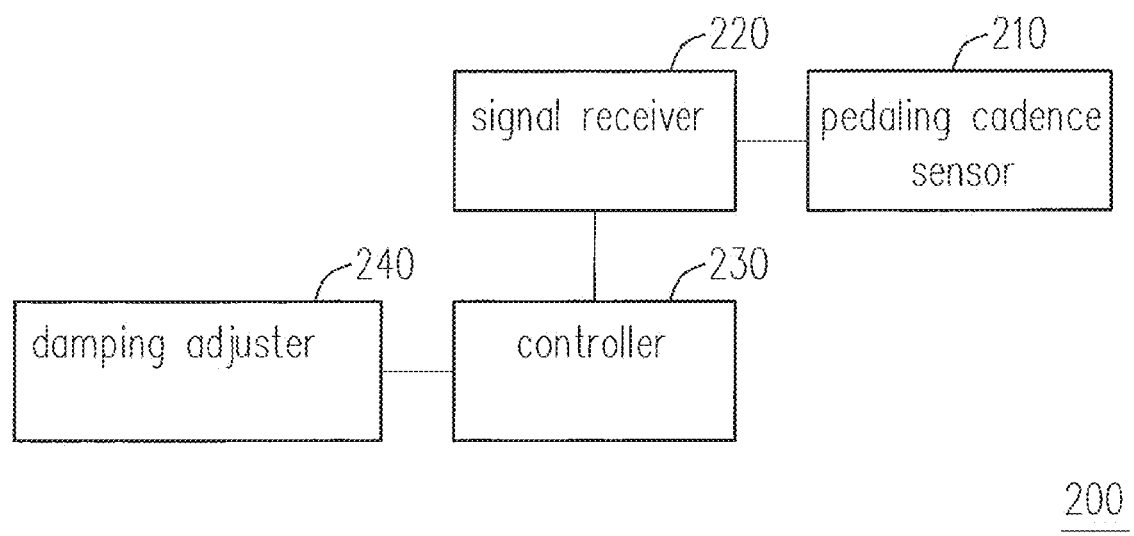
FIG. 2 is a block diagram illustrating an automatic control shock absorber system for a bicycle according to a first embodiment.

FIG. 2 is a block diagram illustrating an automatic control shock absorber system for a bicycle according to the first embodiment. In this embodiment, an automatic control shock absorber system 200 for a bicycle includes a pedaling cadence sensor 210, a signal receiver 220, a controller 230, and a damping adjuster 240.

The pedaling cadence sensor 210 is configured to detect a pedaling cadence of the bicycle 10 and output a pedaling signal. The pedaling cadence sensor 210 may be disposed at one of the chain ring 103, the crank spindle 104, the crank arm 105, the pedal 106, and the frame 100, etc., of the bicycle 10. In addition, the pedaling cadence sensor 210 may also be disposed at a leg, such as both legs (e.g. inner sides of thighs) of the rider, or on a shoe of the rider.

The signal receiver 220 is coupled to the pedaling cadence sensor 210 and the controller 230 to receive and transmit the pedaling signal to the controller 230. Here, the signal receiver 220 may receive and transmit signals through a wire or wirelessly.

The controller 230 is coupled to the signal receiver 220 and the damping adjuster 240. The controller 230 outputs a level control signal according to the pedaling signal, so as to control a level of a damping force. In other words, by outputting the level control signal to the damping adjuster 240, the controller 230 is capable of controlling compression damping, rebound damping, or an air pressure of a pneumatic spring. Meanwhile, the controller 230 may also control a gear of a transmission or a tire pressure simultaneously. Here, the controller 230 may be disposed at a position L1 or a position L2 as indicated in FIG. 1. However, the positions L1 and L2 only serve as an example. The controller 230 may be disposed at an arbitrary position of the bicycle 10.

The damping adjuster 240 is coupled to the controller 230 so as to adjust the level of the damping force according to level control signal. The damping adjuster 240 is disposed in each of the front fork shock absorber 11 and the rear shock absorber 12 shown in FIG. 1. The controller 230 may control damping forces of the front fork shock absorber 11 and the rear shock absorber 12 simultaneously or control the damping force of only one of the front fork shock absorber 11 and the rear shock absorber 12.

Here, the damping force is positively correlated with the pedaling cadence. In addition, as the pedaling cadence increases, it is also possible that the damping force increases in a stepwise manner. For example, FIGS. 3A to 3D are schematic views illustrating relational curves of damping that can be implemented as part of the first embodiment. A relational curve of damping 31 shown in FIG. 1 has a damping force positively correlated with the pedaling cadence, and as the pedaling cadence increases, the damping force increases linearly. Relational curves of damping 32-34, as shown in FIGS. 3B to 3D, illustrate that as the pedaling cadence increases, the damping force increases in a stepwise manner. In addition, FIG. 3B illustrates a five-stage adjustment, FIG. 3C illustrates a four-stage adjustment, and FIG. 3D illustrates a three-stage adjustment.

Specifically, in FIGS. 3A to 3D, X-axis represents the pedaling cadence, with revolutions per minute (RPM) serving as the unit. Y-axis represents the damping force of the shock absorber. Here, levels 1 to 5 are described herein as an example. For example, the number of level represents an extent to which a valve of compression damping is closed. As the number of level increases, the valve of compression damping becomes more closed. Specifically, level 1 indicates that the valve of compression damping is fully open, level 2 indicates that the valve of compression damping is 75% open (i.e. the valve is 25% closed), level 3 indicates that the valve of compression damping is 50% open (i.e. the valve is 50% closed), level 4 indicates that the valve of compression damping is 25% open (i.e. the valve is 75% closed), and level 5 indicates that the valve of compression damping is fully closed. However, the above only serves as an example.

Figure 3A:
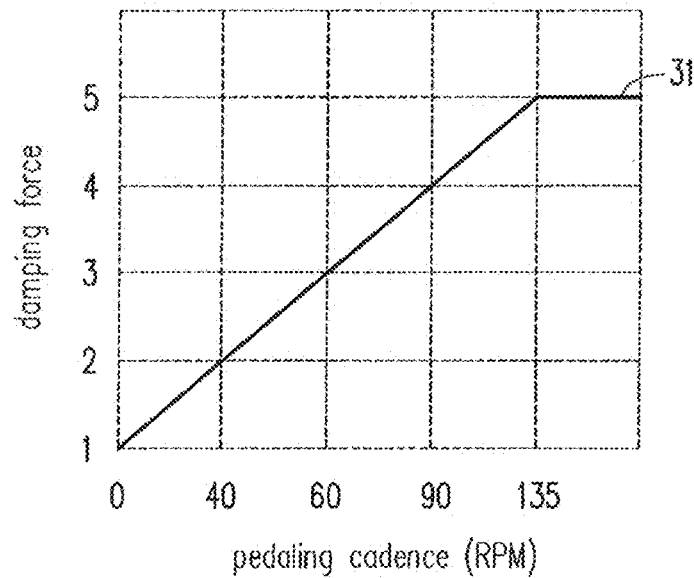
FIGS. 3A to 3D are graphic views illustrating relational curves of damping according to the first embodiment.
Figure 3B:
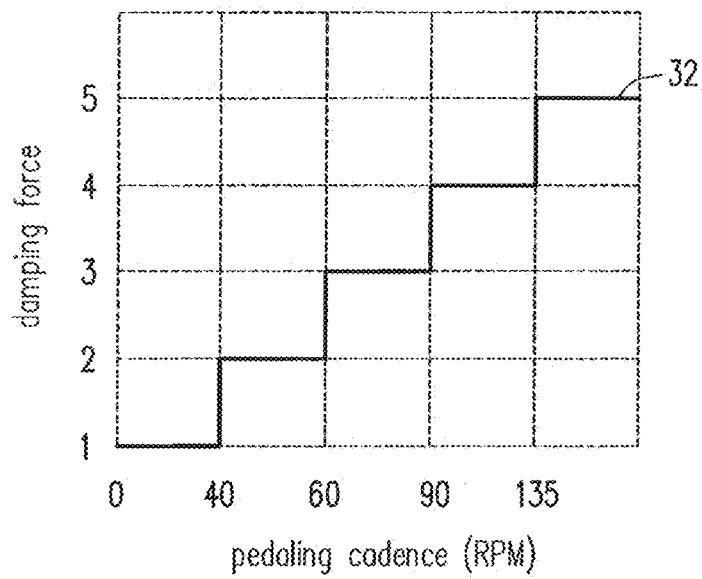
Figure 3C:
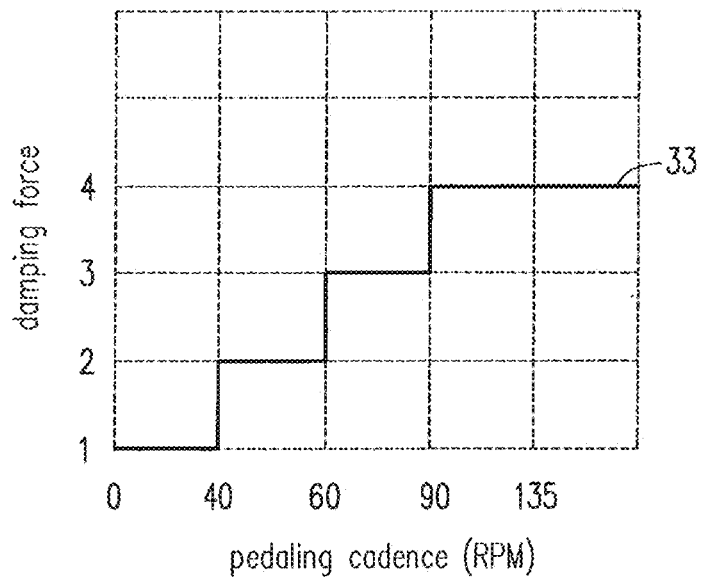
Figure 3D:
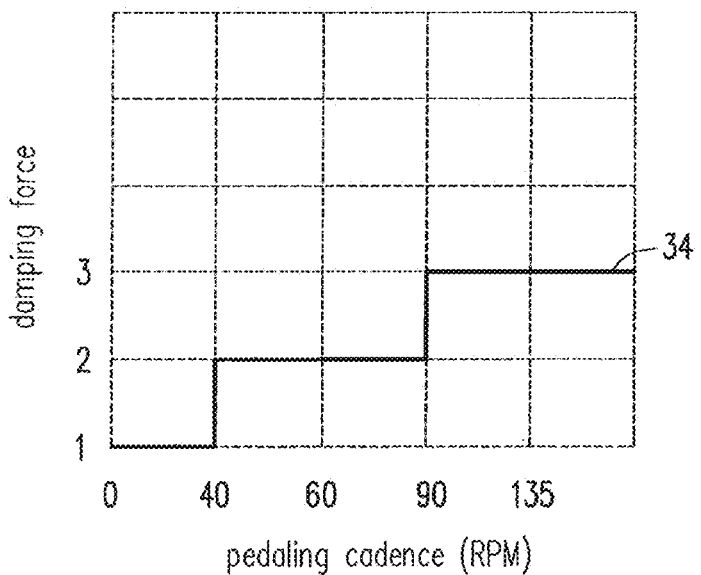

In the relational curve of damping 31 shown in FIG. 3A, when the pedaling cadence is from 0 RPM to 135 RPM, the level of damping force increases linearly as the pedaling cadence increases. When the pedaling cadence exceeds 135 RPM, the damping force is maintained at level 5.

The relational curve of damping 32 shown in FIG. 3B illustrates a five-stage adjustment. When the pedaling cadence is from 0 RPM to 40 RPM, the damping force is adjusted at level 1. When the pedaling cadence is from 40 RPM to 60 RPM, the damping force is adjusted at level 2. When the pedaling cadence is from 60 RPM to 90 RPM, the damping force is adjusted at level 3. When the pedaling cadence is from 90 RPM to 135 RPM, the damping force is adjusted at level 4. When the pedaling cadence exceeds 135 RPM, the damping force is adjusted at level 5.

The relational curve of damping 33 shown in FIG. 3C illustrates a four-stage adjustment. When the pedaling cadence is from 0 RPM to 40 RPM, the damping force is adjusted at level 1. When the pedaling cadence is from 40 RPM to 60 RPM, the damping force is adjusted at level 2. When the pedaling cadence is from 60 RPM to 90 RPM, the damping force is adjusted at level 3. When the pedaling cadence exceeds 90 RPM, the damping force is adjusted at level 4.

The relational curve of damping 34 shown in FIG. 3D illustrates a three-stage adjustment. When the pedaling cadence is from 0 RPM to 40 RPM, the damping force is adjusted at level 1. When the pedaling cadence is from 40 RPM to 90 RPM, the damping force is adjusted at level 2. When the pedaling cadence exceeds 90 RPM, the damping force is adjusted at level 3.

Based on the above, since different pedaling cadences may generate different amplitudes and frequencies to the shock absorber, adjusting the damping force of the shock absorber according to the difference in pedaling cadence not only takes the pedaling efficiency into consideration but also maintains a shock absorbing ability.

Second Embodiment

Figure 4A:
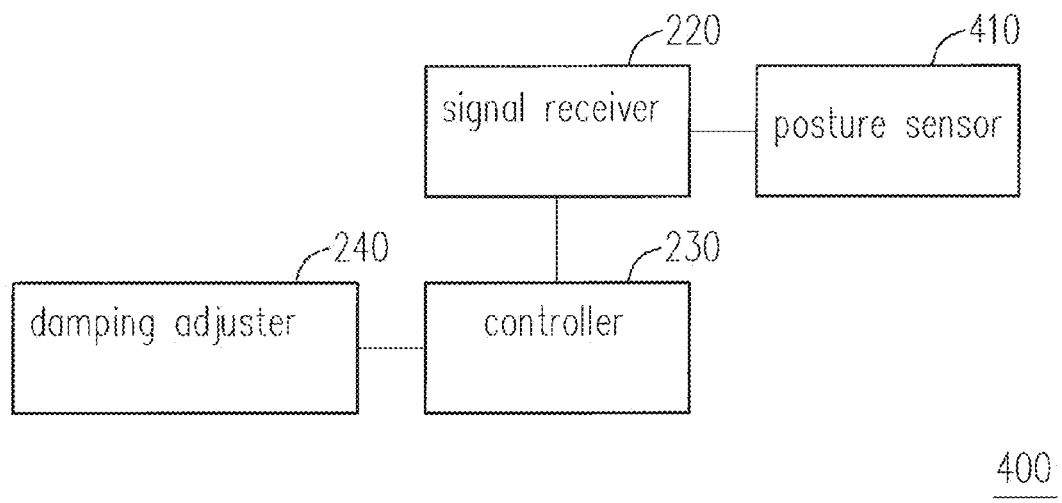
FIGS. 4A and 4B are block diagrams illustrating an automatic control shock absorber system for a bicycle according to a second embodiment.
Figure 4B:
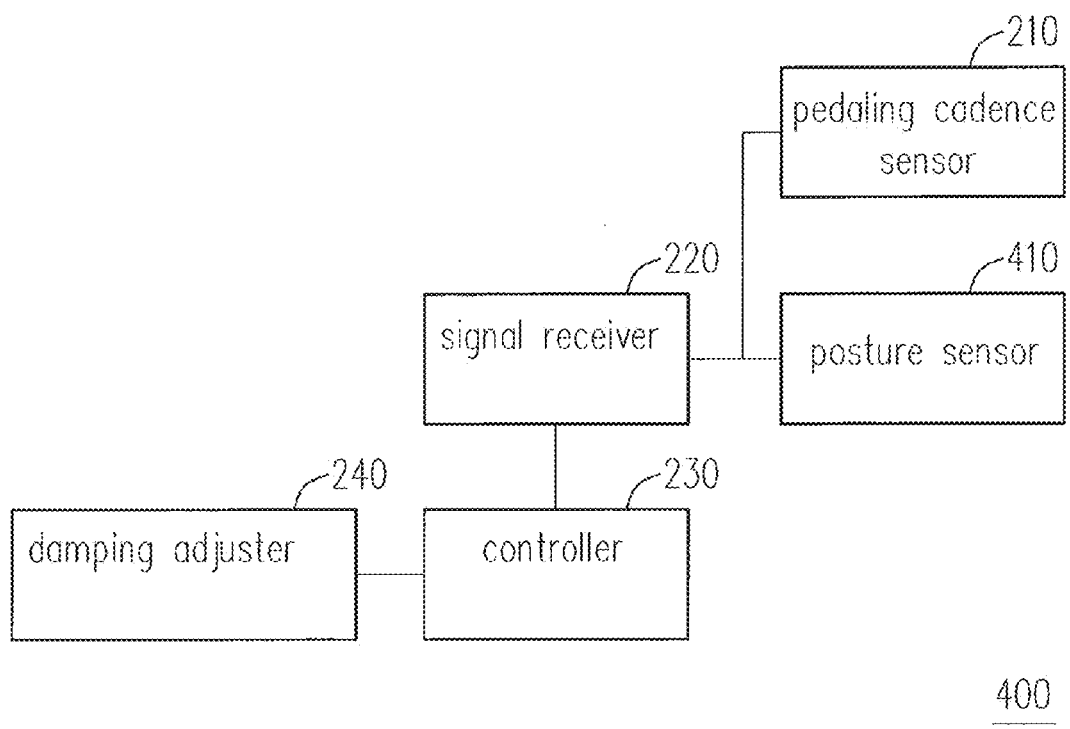

FIGS. 4A and 4B are block diagrams illustrating an automatic control shock absorber system for a bicycle according to the second embodiment. In FIG. 4A, an automatic control shock absorber system 400 for a bicycle includes a posture sensor 410, the signal receiver 220, the controller 230, and the damping adjuster 240. Here, components having the same functions as those described in the first embodiment are referred to with the same reference symbols, and description relevant to the components is omitted.

The posture sensor 410 is configured to detect whether the rider adopts a standing posture or a sitting posture when riding the bicycle 10, and output a posture signal. The signal receiver 220 is coupled to the posture sensor 410 to receive the posture signal. The controller 230 is coupled to the signal receiver 220 and output the level control signal to the damping adjuster 240, such that the damping adjuster 240 adjusts the level of the damping force according to the level control signal.

The posture sensor 410 may be disposed on one of the saddle 107, the saddle post 108, the grip 110, the bicycle handle 112, the handle stem 111, the pedal 106, the frame 100, the front fork 101, the rear shock absorber 12, the hub 109, the crank spindle 104, and the controller 230, etc., so as to obtain sensing data for judging a pedaling posture of the rider.

In the following, a pressure sensor serving as the posture sensor 410 is described as an example. The pressure sensor may be disposed inside the saddle 107 or the saddle post 108 to serve as the posture sensor 410. When the posture sensor 410 senses that a force is applied, the pedaling posture is the sitting posture, when the posture sensor 410 does not senses a force being applied, the pedaling posture is the standing posture. Alternatively, the pressure sensor may be disposed at each of the left and right pedals 106, the left and right grips 110, the left and right bicycle handles 112, or the handle stem 111 (or any two points of the bicycle where forces are applied) to serve as the posture sensor 410. However, the posture sensor is not limited thereto. The posture sensor 410 may also be an optical sensor, a radar, or other suitable sensors capable of sensing the change of center of gravity and posture of the rider.

In FIG. 4B, the automatic control shock absorber system 400 for the bicycle may also include the pedaling cadence sensor 210 and the posture sensor 410 simultaneously. Since in actual riding, the pedaling posture of the rider may exhibit a significant change in the center of gravity or significant change of pedaling manners, the bicycle needs to have a function of correspondingly changing a suspension characteristic of the bicycle. Since the rider is about 5 to 10 times heavier than the bicycle, pedaling conditions of the rider need to be taken care of seriously and should not be treated uniformly. Roughly speaking, shock absorbing when pedaling in the standing posture and shock absorbing when pedaling in the sitting posture are different by two times or more. Thus, it is more preferable if the pedaling cadence and pedaling posture are taken into consideration simultaneously.

In FIG. 4B, the controller 230 may determine a relational curve of damping based on the posture signal, and output the level control signal according to the pedaling signal based on the relational curve of damping. Accordingly, the damping adjuster 240 adjusts the level of the damping force according to the level control signal.

Here, the pedaling posture includes the standing posture and the sitting posture. The controller 230 may determine whether the relational curve of damping is the relational curve for the sitting posture or the relational curve for the standing posture based on the curve control signal. In actual riding, the rider may prepare ahead in correspondence to pavement conditions and simultaneously change a manner of riding. For example, when there is an obstacle, the rider may stop pedaling to pass the obstacle at a lower speed (to reduce shaking of the frame). During uphill riding, the rider may switch the pedaling posture to move the body forward and shift to a lighter gear to change the cadence. During cornering, the rider generally tends to lower the center of gravity and lower the pedaling cadence. Thus, two relational curves of damping, i.e. the relational curve for the sitting posture and the relational curve for the standing posture, may be provided to correspond to the two different riding postures, i.e. the sitting posture and the standing posture. A slope of curve of the relational curve for the standing posture is steeper than that of the relational curve for the sitting posture.

Figure 5A:
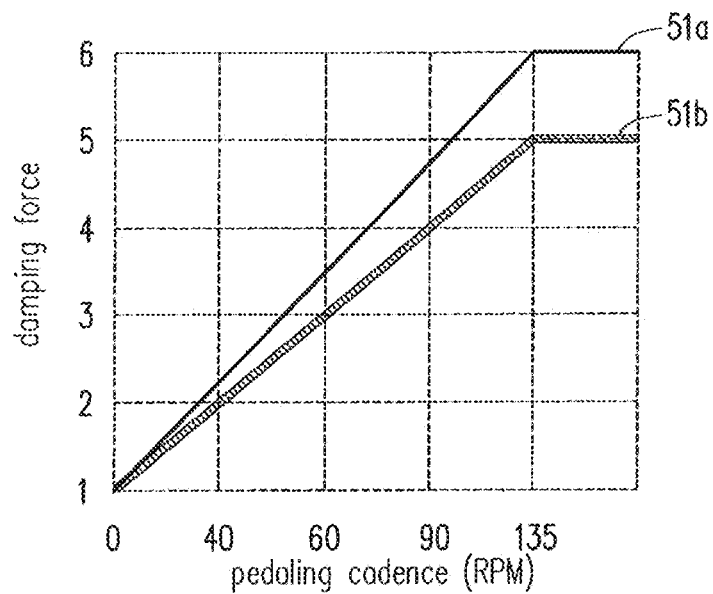
FIGS. 5A to 5D are graphic views illustrating relational curves of damping according to the second embodiment.
Figure 5B:
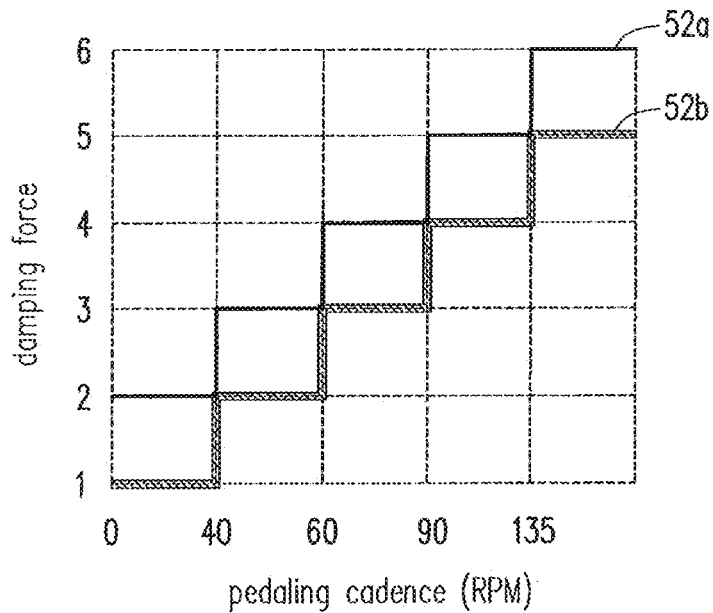
Figure 5C:
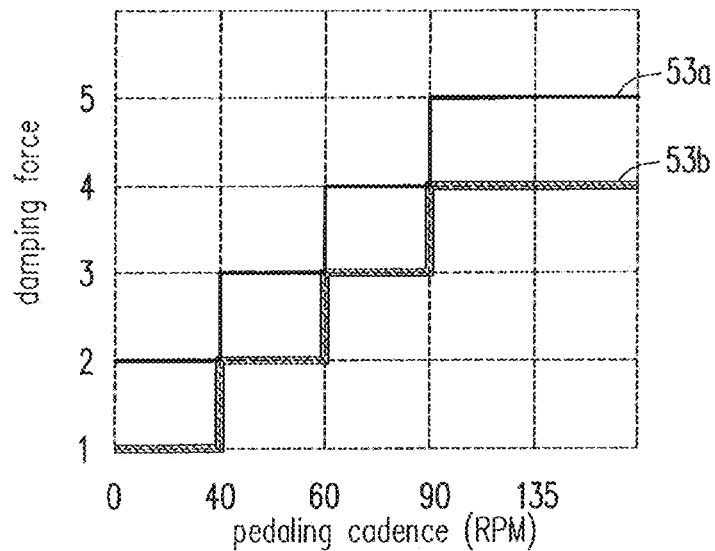
Figure 5D:
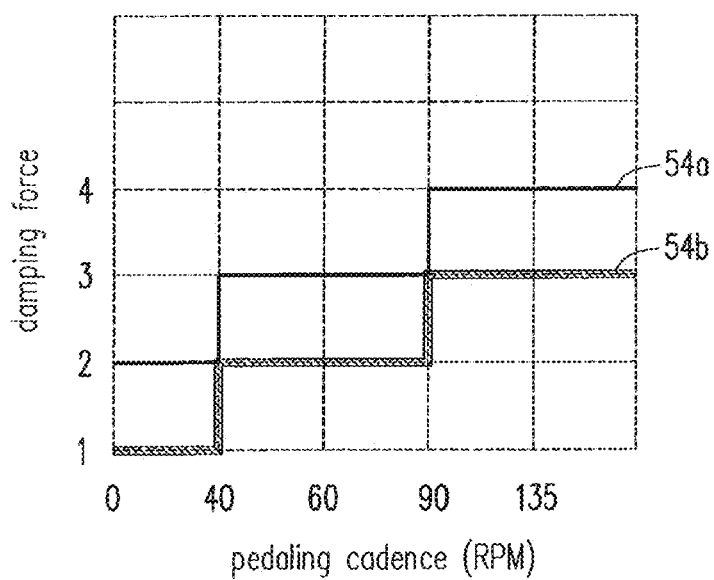

For example, FIGS. 5A to 5D are graphs illustrating relational curves of damping according to the second embodiment. In FIGS. 5A to 5D, X-axis represents for the pedaling cadence, with revolutions per minute (RPM) serving as the unit. Y-axis represents the damping force of the shock absorber. Here, the damping force illustrated in FIGS. 5A and 5B are set from level 1 to level 6. Alternatively, the damping force may be set from level 1 to level 5, as shown in FIG. 5C, or set from level 1 to level 4, as shown in FIG. 5D. Details regarding the damping force may be referred to the first embodiment. Therefore, no further details in this respect will be reiterated below.

In FIG. 5A, a relational curve 51a for the standing posture and a relational curve 51b for the standing posture make adjustment linearly. When the posture signal indicates that the posture is the standing posture, the relational curve 51a for the standing posture is chosen, and a corresponding level is selected based on the relational curve 51a for the standing posture according to the pedaling cadence detected. When the posture signal indicates that the posture is the sitting posture, the relational curve 51b for the sitting posture is chosen, and a corresponding level is selected based on the relational curve 51*b* for the standing posture according to the pedaling cadence detected.

For example, assuming that the posture signal indicates that the posture is the sitting posture, and the pedaling cadence detected is 60 RPM, the controller 230 then selects the corresponding level 3 based on the relational curve 51*b* for the sitting posture 51*b* according to the pedaling cadence at 60 RPM, and outputs the level control signal. Accordingly, when receiving the level control signal, the damping adjuster 240 adjusts the damping force to level 3.

It is also possible that the relational curves for the standing posture and for the sitting posture may increase in a stepwise manner as the pedaling cadence increases, as shown in FIGS. 5B to 5D. In FIG. 5B, a relational curve 52*a* for the standing posture and a relational curve 52*b* for the sitting posture make a six-stage adjustment, where the damping force is set from level 1 to level 6. In FIG. 5C, a relational curve 53*a* for the standing posture and a relational curve 53*b* for the sitting posture make a five-stage adjustment. In FIG. 5D, a relational curve 54*a* for the standing posture and a relational curve 54*b* for the sitting posture make a four-stage adjustment, where the damping force is set from level 1 to level 4.

Based on the above, compared with a complicated pavement signal generated by detecting pavement conditions, judging the pavement conditions according to the rider is faster and more direct, and less prone to errors. By detecting the pedaling posture, reaction may be made in advance or simultaneously to correspond to riding scenarios, so as to take care of influences on changes of the center of gravity due to pedaling in the standing and sitting postures. Thus, the control method incorporating judging the pedaling posture and detecting the pedaling cadence, which further determines a plurality of riding manners such as riding in the sitting posture, the standing postures, etc., offers a more direct, more efficient, and simpler effect.

Third Embodiment

Figure 6:
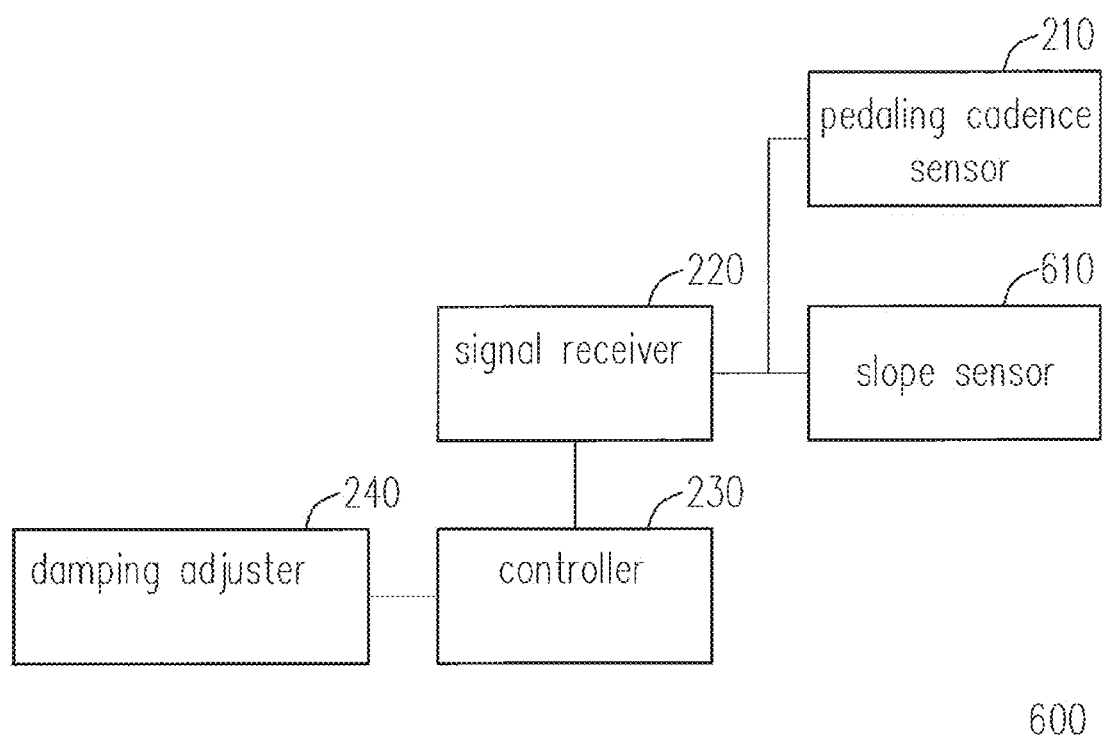
FIG. 6 is a block diagram illustrating an automatic control shock absorber system for a bicycle according to a third embodiment.

FIG. 6 is a block diagram illustrating an automatic control shock absorber system for a bicycle according to the third embodiment. An automatic control shock absorber system for a bicycle of the embodiment includes the pedaling cadence sensor and a slope sensor. Referring to FIG. 6, an automatic control shock absorber system 600 for a bicycle includes the pedaling cadence sensor 210, a slope sensor 610, the signal receiver 220, the controller 230, and the damping adjuster 240. Here, components having the same functions as those described in the first embodiment are referred to with the same reference symbols, and description relevant to the components is omitted.

The slope sensor 610 is configured to detect a slope of a location of the bicycle 10 and output a slope signal, such that the slope signal is transmitted to the controller 230 through the signal receiver 220. Here, the controller 230 determines a relational curve of damping according to the slope signal, and outputs the level control signal according to the pedaling signal based on the relational curve of damping.

Figure 7A:
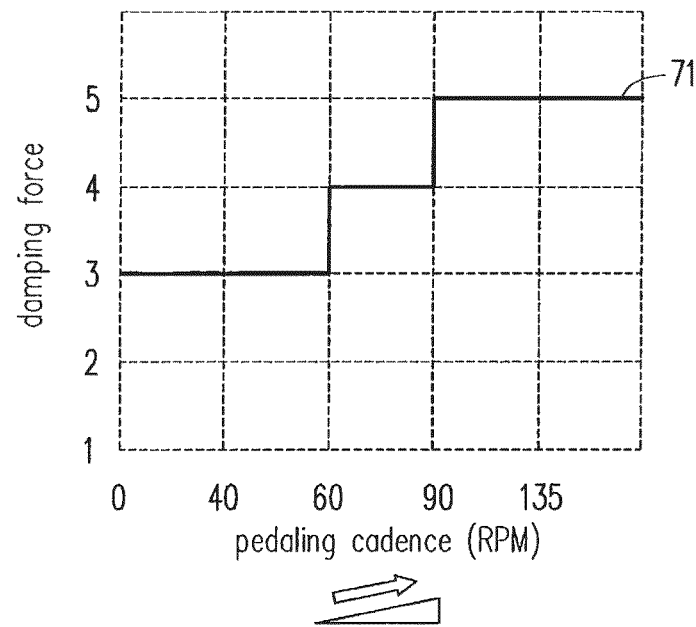
FIGS. 7A to 7C are graphic views illustrating relational curves of damping according to the third embodiment.
Figure 7B:
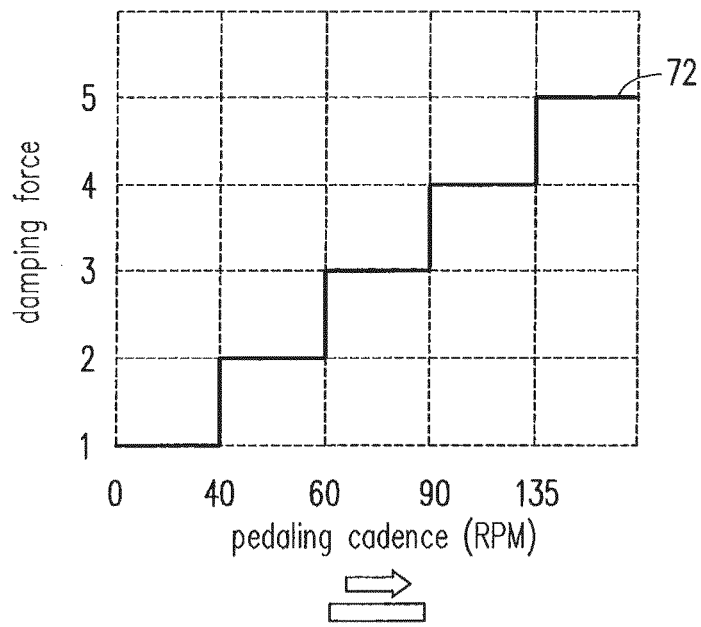
Figure 7C:
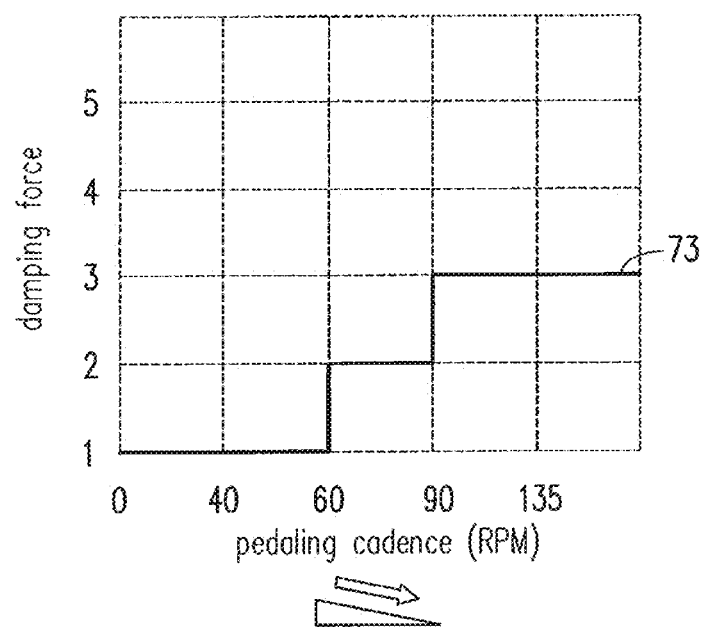

For example, FIGS. 7A to 7C are schematic views illustrating relational curves of damping according to the third embodiment. In this embodiment, relational curves shown in FIGS. 7A to 7C are step-like (stage-adjustment). In the figures, X-axis represents the pedaling cadence, Y-axis represents the damping force of the shock absorber, and level 1 to level 5 are described as an example. Details regarding the damping force may be referred to the first embodiment. FIG. 7A shows an uphill relational curve 71, FIG. 7B shows a flat (or plane) relational curve 72, and FIG. 7C shows a downhill relational curve 73.

When the slope signal indicates an uphill, the uphill relational curve 71 is chosen, and a corresponding level is selected based on the uphill relational curve 71 according to the pedaling cadence detected. When the slope signal indicates a flat slope, the flat relational curve 72 is chosen, and a corresponding level is selected based on the flat relational curve 72 according to the pedaling cadence detected. When the slope signal indicates a downhill, the downhill relational curve 73 is chosen, and a corresponding level is selected based on the downhill relational curve 73 according to the pedaling cadence detected.

Figure 8A:
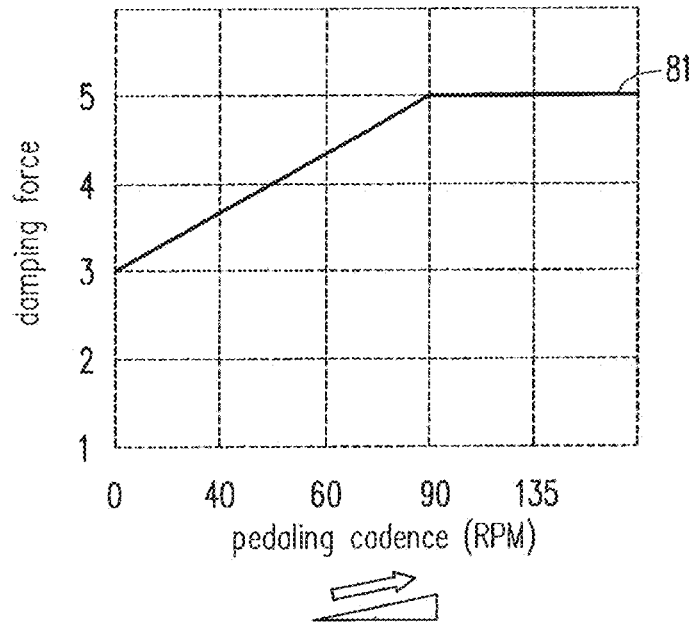
FIGS. 8A to 8C are graphic views illustrating another relational curve of damping according to the third embodiment.
Figure 8B:
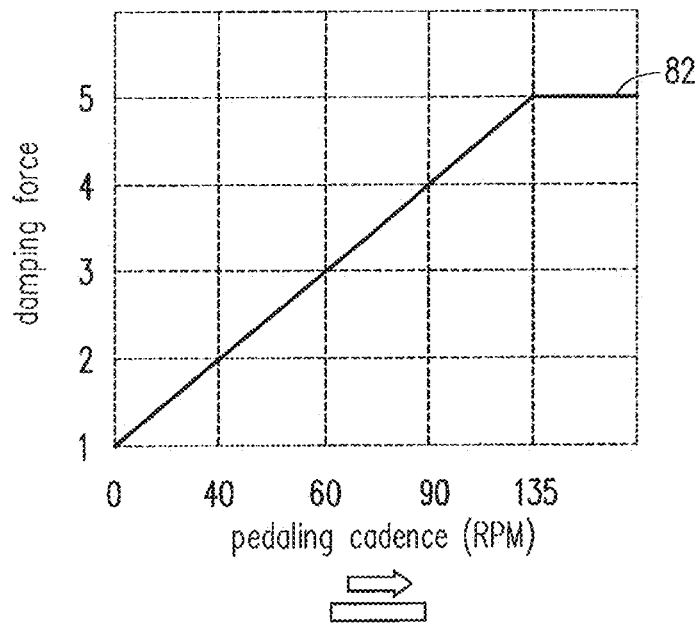
Figure 8C:
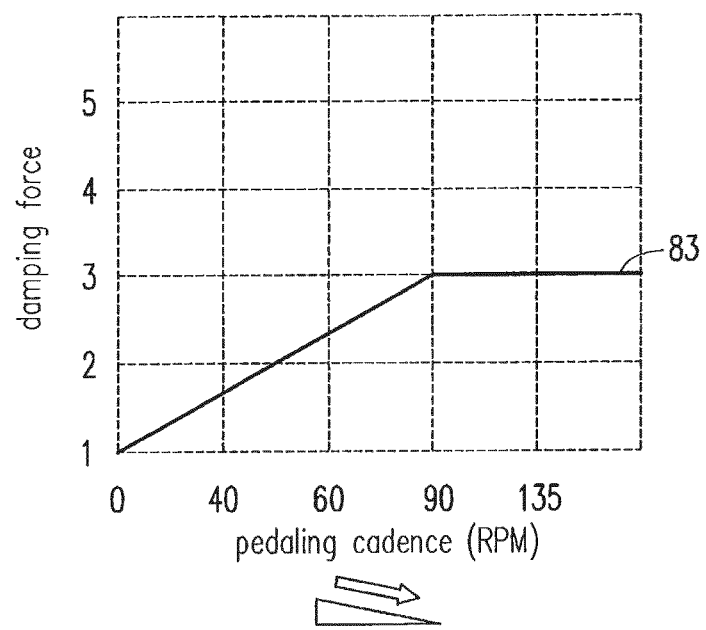

In addition, the damping force in the relational curve of damping may also be positively correlated with the pedaling cadence, using stepless adjustment, as shown in FIGS. 8A to 8C. FIGS. 8A to 8C are schematic views illustrating another relational curve of damping according to the third embodiment. In this embodiment, relational curves of damping shown in FIGS. 8A to 8C indicate that the damping force is positively correlated with the pedaling cadence. In the figures, X-axis represents the pedaling cadence, Y-axis represents the damping force of the shock absorber, and level 1 to level 5 are described as an example. Details regarding the damping force may be referred to the first embodiment. Therefore, no further details in this respect will be reiterated below. FIG. 8A shows an uphill relational curve 81, FIG. 8B shows a flat slope relational curve 82, and FIG. 8C shows a downhill relational curve 83.

Fourth Embodiment

Figure 9:
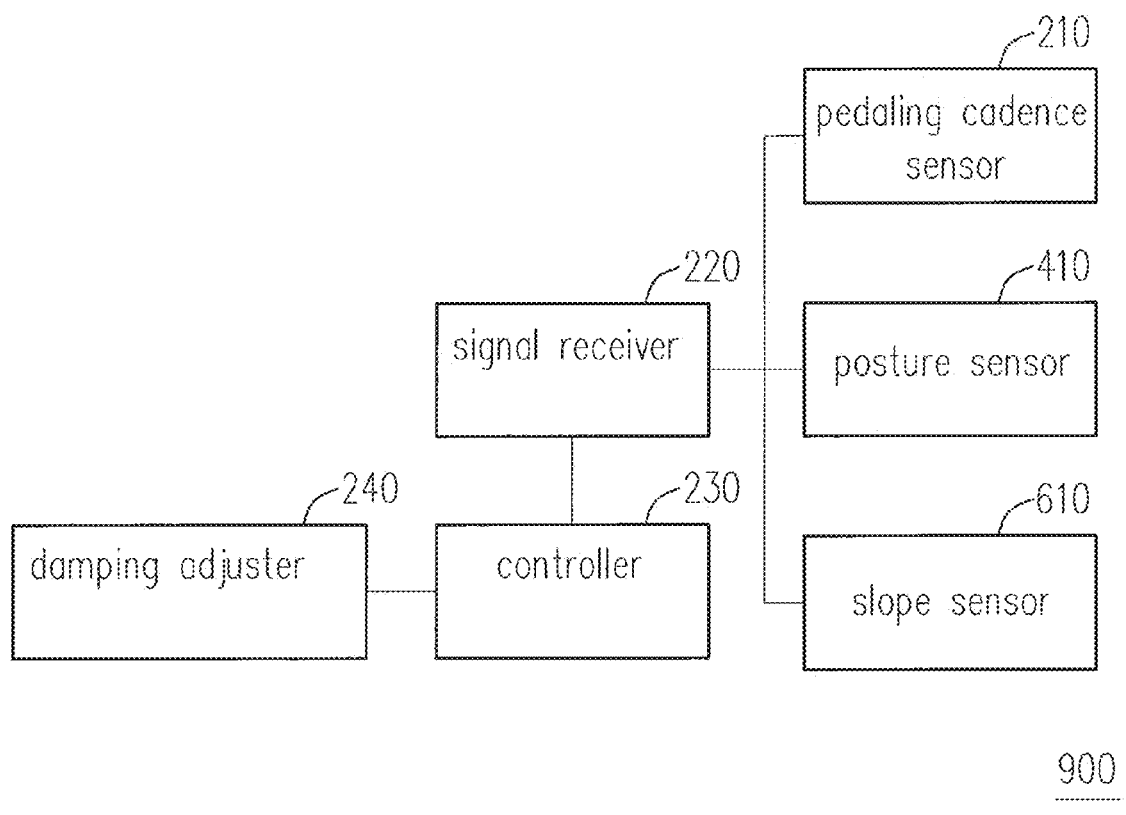
FIG. 9 is a block diagram illustrating an automatic control shock absorber system for a bicycle according to a fourth embodiment.

FIG. 9 is a block diagram illustrating an automatic control shock absorber system for a bicycle according to a fourth embodiment. In this embodiment, an automatic control shock absorber system 900 for a bicycle includes the pedaling cadence sensor 210, the posture sensor 410, the slope sensor 610, the signal receiver 220, the controller 230, and the damping adjuster 240.

In this embodiment, the controller 230 may determine a relational curve of damping according to the posture signal and the slope signal, and output the level control signal according to the pedaling signal based on the relational curve of damping. Accordingly, the damping adjuster 240 adjusts the level of the damping force according to the level control signal.

Figure 10A:
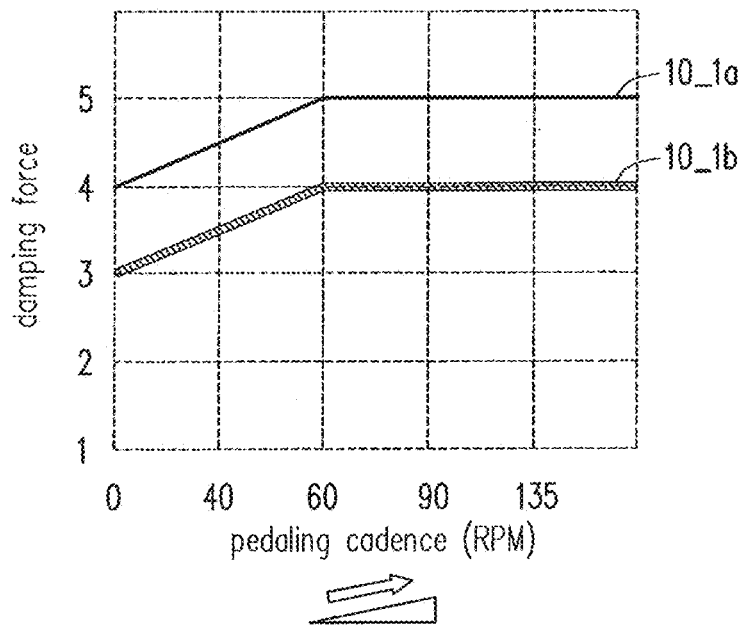
FIGS. 10A to 10C are graphic views illustrating relational curves of damping according to the fourth embodiment.
Figure 10B:
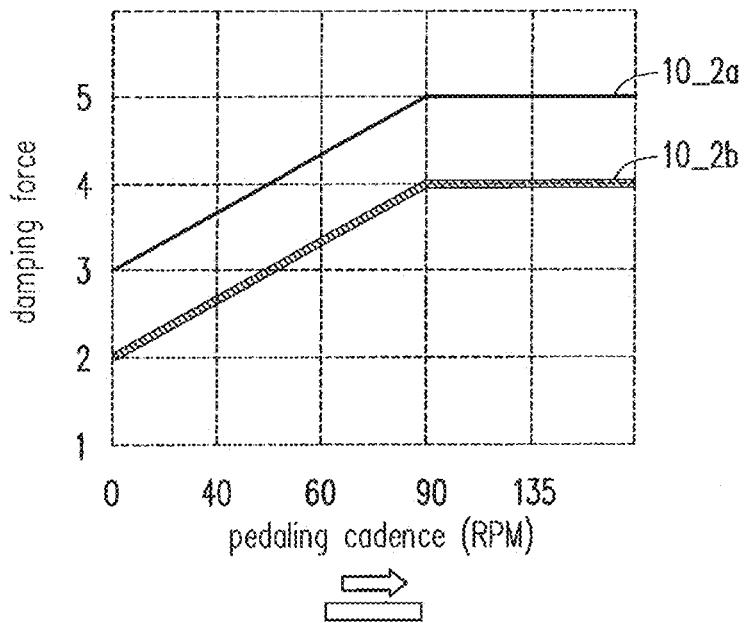
Figure 10C:
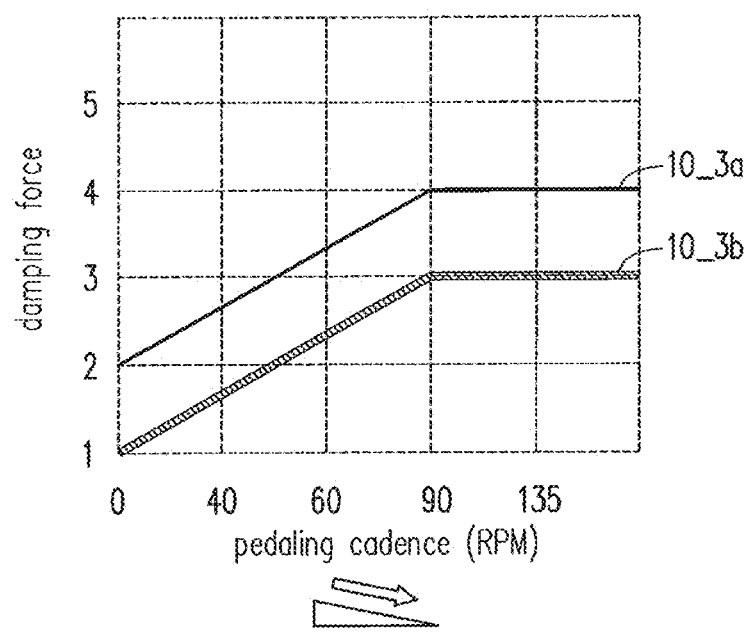

For example, FIGS. 10A to 10C are schematic views illustrating relational curves of damping according to the fourth embodiment. Here, the damping force is positively correlated with the pedaling cadence (i.e. stepless adjustment) in the relational curves of damping. In addition, X-axis represents the pedaling cadence, Y-axis represents the damping force of the shock absorber. Details regarding the damping force may be referred to the first embodiment.

FIG. 10A illustrates uphill relational curves of damping, including a relational curve 10_1*a* for the standing posture and a relational curve 10_1*b* for the sitting posture. FIG. 10B illustrates flat slope relational curves of damping, including a relational curve 10_2*a* for the standing posture and a relational curve 10_2*b* for the sitting posture. FIG. 10C illustrates downhill relational curves of damping, including a relational curve 10_3*a* for the standing posture and a relational curve 10_3*b* for the sitting posture.

Figure 11A:
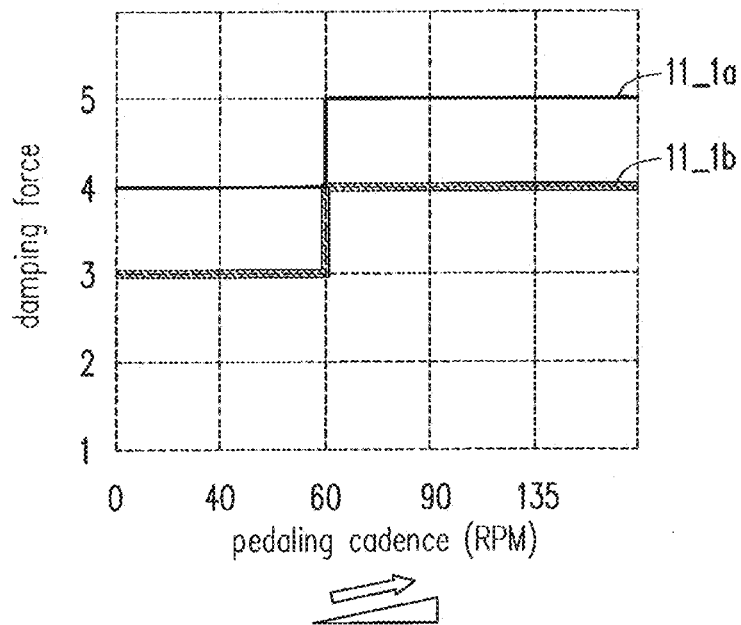
FIGS. 11A to 11C are graphic views illustrating another relational curve of damping according to the fourth embodiment.
Figure 11B:
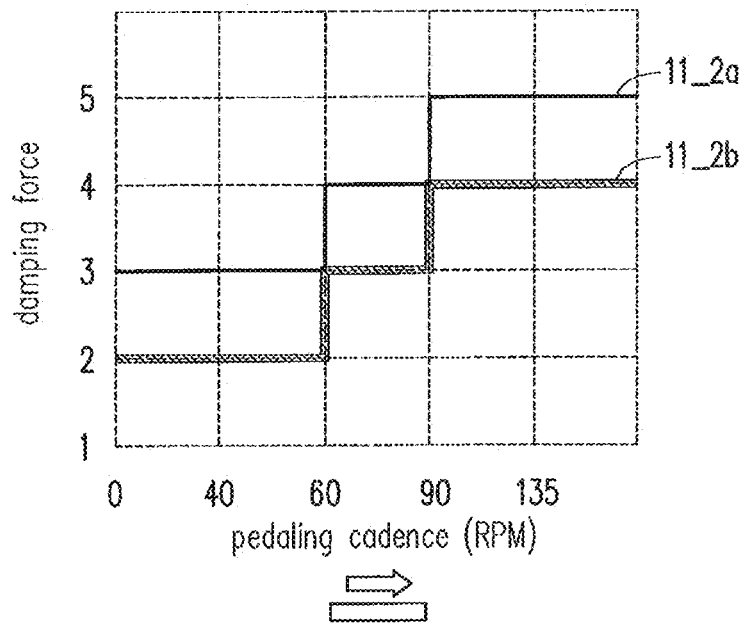
Figure 11C:
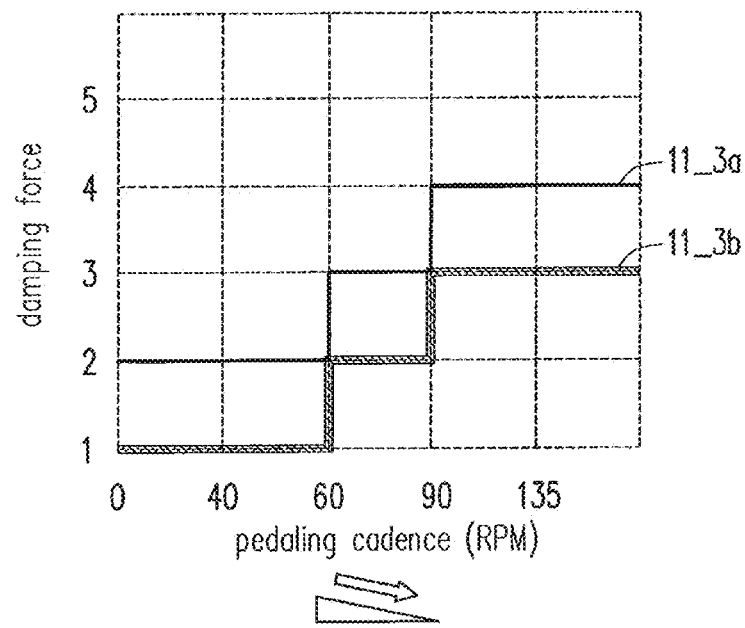

In addition, the relation between the damping force and the pedaling cadence in the relational curves of damping may be step-like (stage-adjustment), as shown in FIGS. 11A to 11C. FIGS. 11A to 11C are schematic views illustrating another relational curve of damping according to the fourth embodiment. Here, X-axis represents the pedaling cadence, and Y-axis represents the damping force of the shock absorber. Details regarding the damping force may be referred to the first embodiment.

FIG. 11A illustrates uphill relational curves of damping, including a relational curve 11_1a for the standing posture and a relational curve 11_1b for the sitting posture. FIG. 11B illustrates flat slope relational curves of damping, including a relational curve 11_2a for the standing posture and a relational curve 11_2b for the sitting posture. FIG. 11C illustrates downhill relational curves of damping, including a relational curve 11_3a for the standing posture and a relational curve 11_3b for the sitting posture.

Accordingly, taking FIGS. 11A to 11C as an example, and assuming that the slope signal detected indicates a downhill, the posture signal detected indicates the sitting posture, and the current pedaling cadence is 70 RPM, then the controller 230 may choose the curves shown in FIG. 11C, then choose the relational curve 11_3b for the sitting posture according to the posture signal, and choose the corresponding level 2 based on the pedaling cadence at 70 RPM.

Figure 12A:
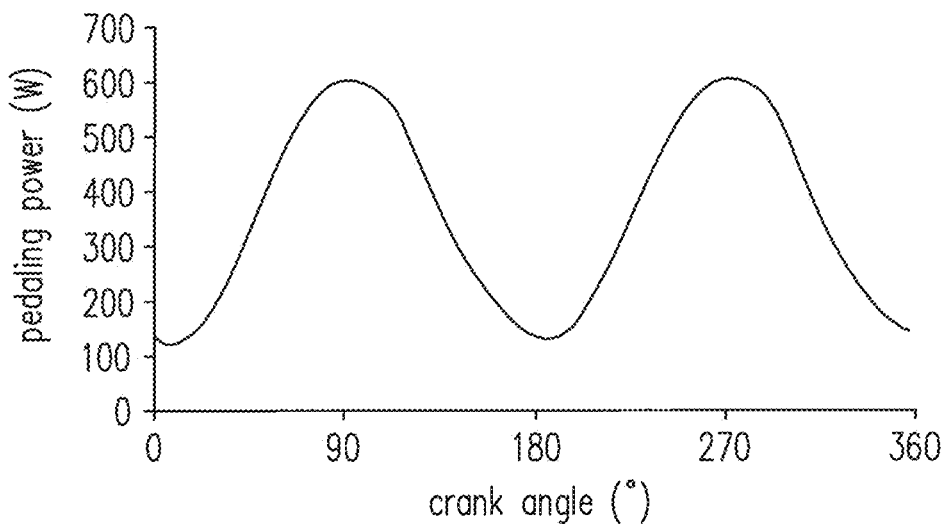
FIGS. 12A to 12C are curve diagrams illustrating relations between a crank angle and pedaling power, pedaling force, and pedaling torque, respectively.
Figure 12B:
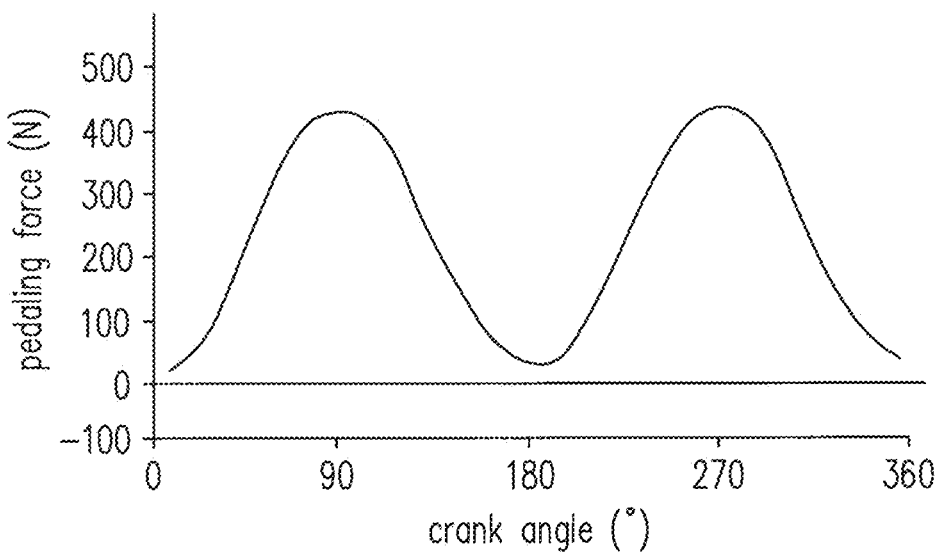
Figure 12C:
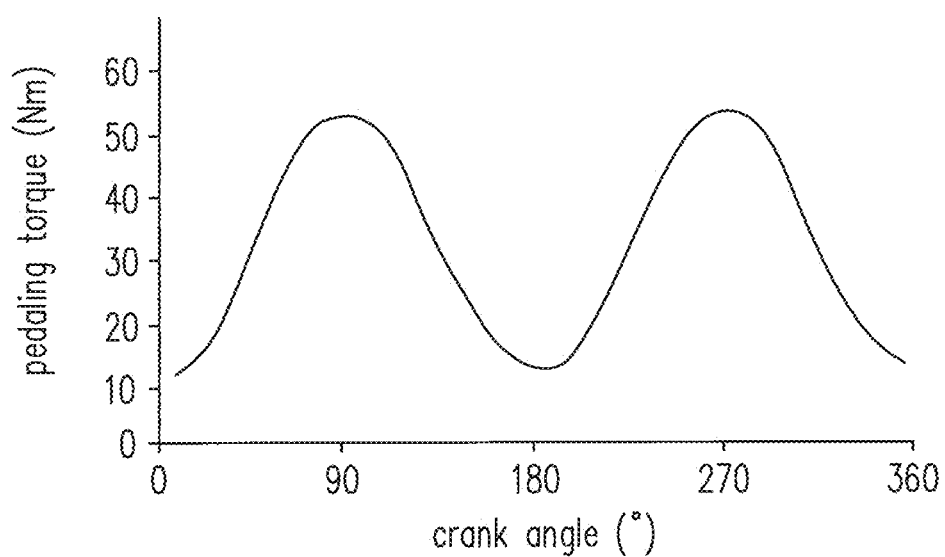

The pedaling cadence may be obtained from one of a plurality of information generated by sensing the chain ring 103, the crank arm 105, the crank spindle 104, or the pedal 106. The information are, for example, revolutions per minute (RPM), an angular velocity (radian per second), or a variation frequency of pedaling power, pedaling force, or pedaling torque. For example, FIGS. 12A to 12C are curve diagrams illustrating relations between a crank angle and pedaling power, pedaling force, and pedaling torque, respectively, according to an embodiment. FIG. 12A illustrates a curve diagram between the crank angle and the pedaling power, FIG. 12B illustrates a curve diagram between the crank angle and the pedaling force, and FIG. 12C illustrates a curve diagram between the crank angle and the pedaling torque. Through the illustration of FIGS. 12A to 12C, the relation between the crank angle and the pedaling power, pedaling force, and pedaling torque is clearly shown.

Figure 13:
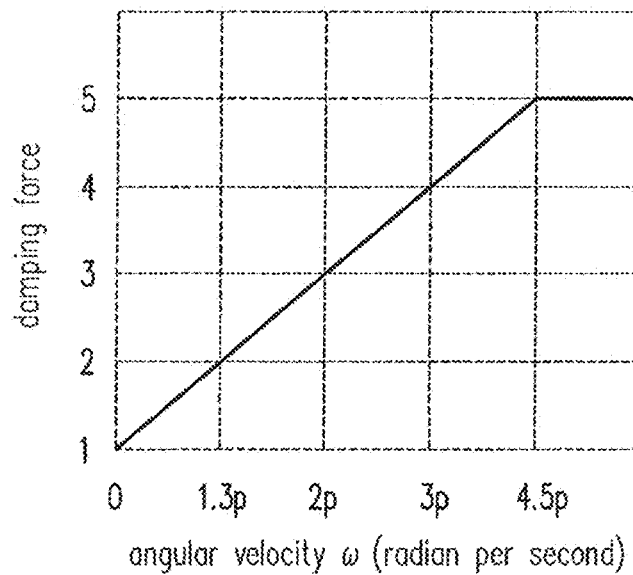
FIG. 13 is a schematic view illustrating a relational curve of damping based on an angular velocity.
Figure 14:
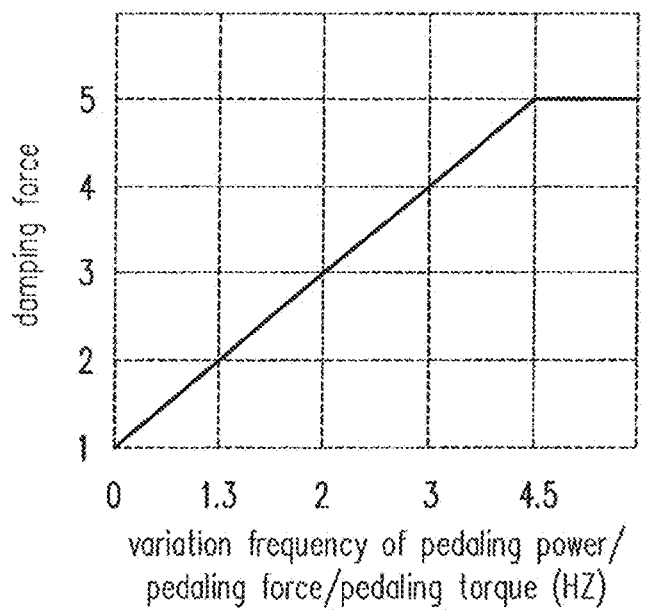
FIG. 14 is a schematic view illustrating a relational curve of damping based on variation frequency of pedaling power, pedaling force, and pedaling torque.
Figure 15A:
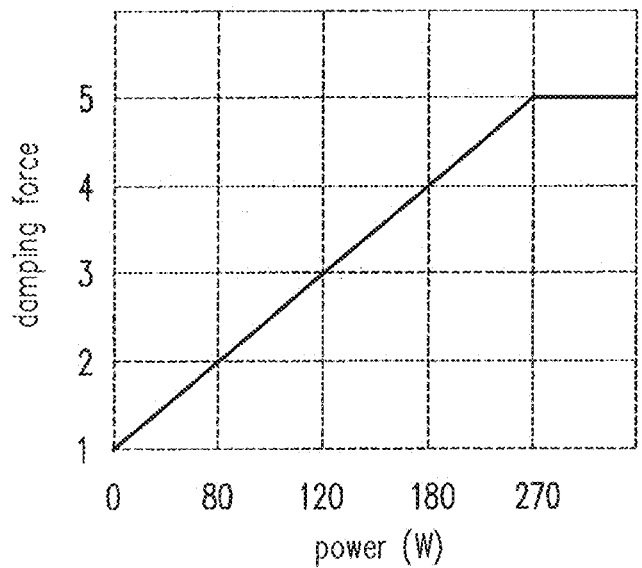
FIGS. 15A to 15D are schematic views illustrating relational curves of damping based on power.
Figure 15B:
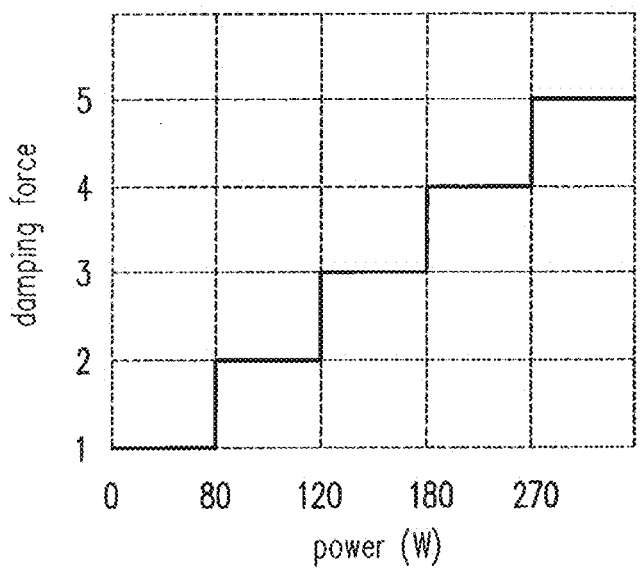
Figure 15C:
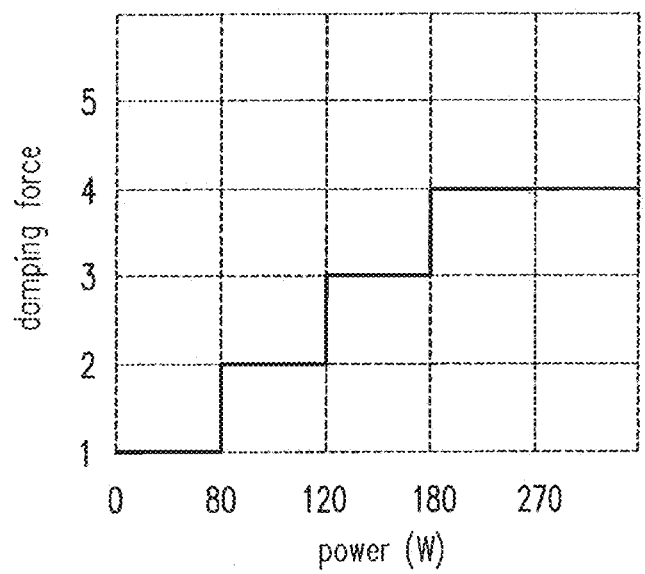
Figure 15D:
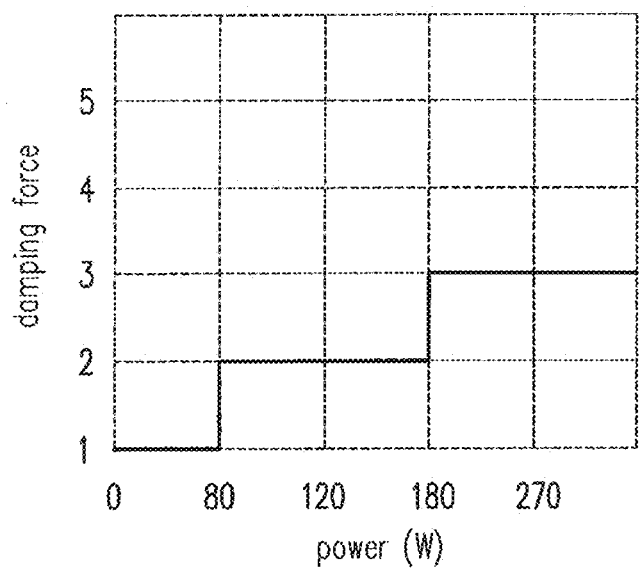

In the following, an example is further provided to describe making adjustment to the level of the damping force based on the angular velocity (radian per second). FIG. 13 is a graph illustrating a relational curve of damping based on an angular velocity according to an embodiment. FIG. 13 illustrates a relational curve of damping for adjusting the level of the damping force according to the angular velocity. FIG. 14 illustrates a relational curve of damping for adjusting the level of the damping force according to the variation frequency (Hz) of the pedaling power/pedaling force/pedaling torque.

In addition, a power sensor may be further disposed in the automatic control shock absorber systems 200, 400, 600 and 900 for the bicycle, so as to further adjust the level of the damping force based on a power obtained according to the pedaling torque and the angular velocity. FIGS. 15A to 15D are schematic views illustrating relational curves of damping based on power according to an embodiment. The relational curve shown in FIG. 15A indicates a stepless adjustment, the relational curve shown in FIG. 15B indicates a three-stage adjustment, the relational curve shown in FIG. 15C indicates a four-stage adjustment, and the relational curve shown in FIG. 15D indicates a three-stage adjustment.

Figure 16A:
FIGS. 16A and 16B are schematic views illustrating pedaling postures.
Figure 16B:
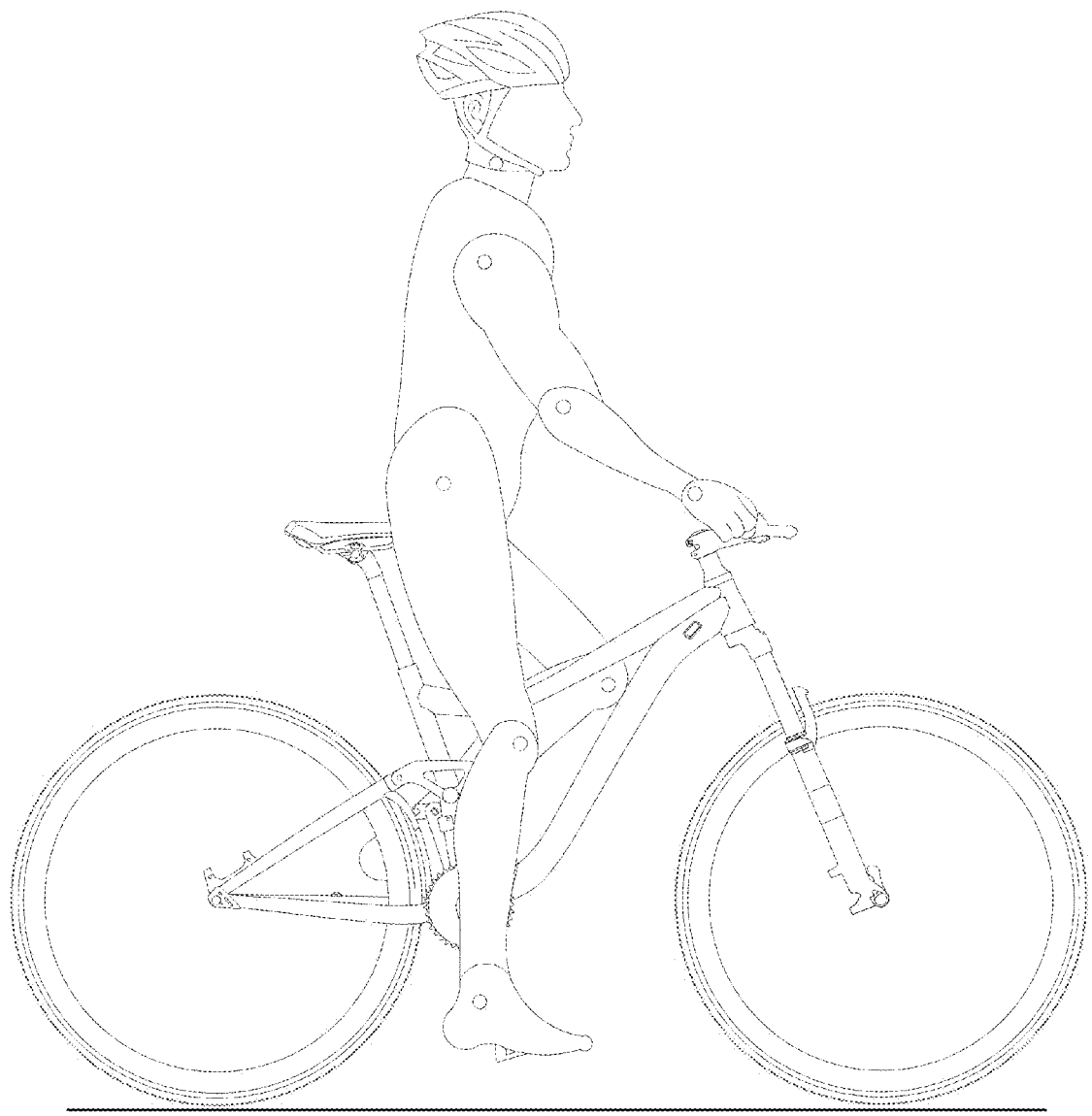

FIGS. 16A and 16B are schematic views illustrating pedaling postures according to an embodiment. The pedaling posture shown in FIG. 16A is the sitting posture, and the pedaling posture shown in FIG. 16B is the standing posture.

In actual riding, the rider may prepare ahead in correspondence to pavement conditions and simultaneously change a manner of riding. For example, when there is an obstacle, the rider may stop pedaling to pass the obstacle at a lower speed (to reduce shaking of the frame). During uphill riding, the rider may switch the pedaling posture to move the body forward and shift to a lighter gear to change the cadence. During cornering, the rider generally tends to lower the center of gravity and lower the pedaling cadence.

In view of the foregoing, the damping force may be adjusted according to different pedaling cadences, different pedaling postures, or the slope of the location. In addition, the factors above may be combined to correspondingly adjust the damping force. In this way, the pedaling efficiency may be significantly improved.

Fifth Embodiment

Figure 17:
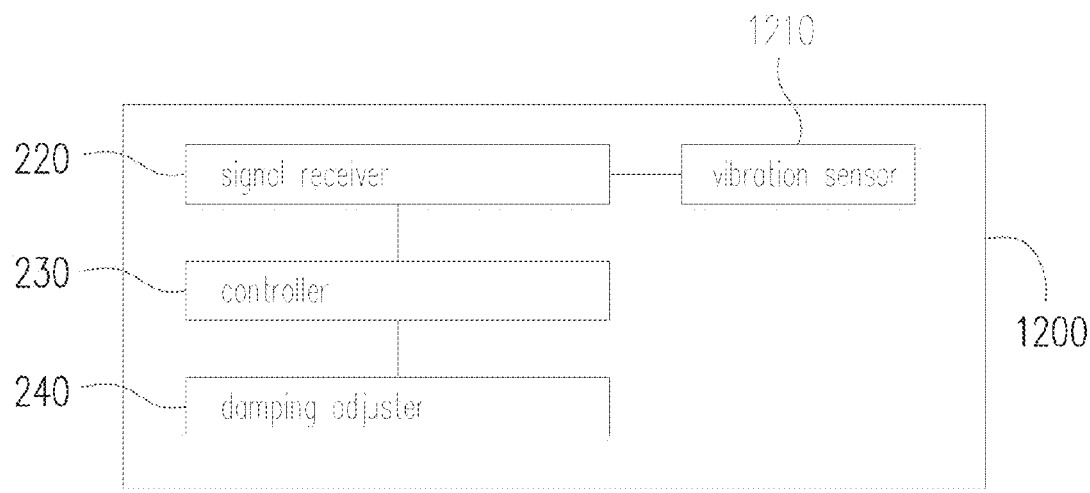
FIG. 17 is a block diagram illustrating an automatically adjusting damping system for a bicycle according to a fifth embodiment.

FIG. 17 is a block diagram illustrating an automatically adjusting damping system for a bicycle according to a fifth embodiment. In this embodiment, an automatically adjusting damping system 1200 for a bicycle includes a vibration sensor 1210, the signal receiver 220, the controller 230, and the damping adjuster 240.

The vibration sensor 1210 may be disposed at a position such as the saddle 107, the saddle post 108, the bicycle handle 112, the handle stem 111, the frame 100, the front fork 101, the rear fork 114, or the rear shock absorber 12, etc., of the bicycle 10. The vibration sensor 1210 detects vibration generated by a body of the bicycle 10, so as to output a corresponding vibration signal. The vibration sensor 1210 is a g-sensor, for example.

The signal receiver 220 is coupled to the vibration sensor 210 and the controller 230 to receive the vibration signal of the vibration sensor 210 and transmit the vibration signal to the controller 230. Here, the signal receiver 220 may receive and transmit signals through a wire or wirelessly.

The controller 230 is coupled to the signal receiver 220 and the damping adjuster 240. The controller 230 outputs a level control signal according to the vibration signal received, so as to control a level of a damping force of the damping adjuster 240. In other words, by outputting the level control signal to the damping adjuster 240, the controller 230 is capable of controlling compression damping, rebound damping, or an air pressure of a pneumatic spring. Meanwhile, the controller 230 may also control a gear of a transmission or a tire pressure simultaneously. Here, the controller 230 may be disposed at a position L1 or a position L2 as indicated in FIG. 1. However, the positions L1 and L2 only serve as an example. The controller 230 may be disposed at an arbitrary position of the bicycle 10.

The damping adjuster 240 is coupled to the controller 230, so as to adjust the level of the damping force according to the level control signal. The damping adjuster 240 may be disposed in each of the front fork shock absorber 11 and the rear shock absorber 12 shown in FIG. 1. The controller 230 may control damping forces of the front fork shock absorber 11 and the rear shock absorber 12 simultaneously or control the damping force of only one of the front fork shock absorber 11 and the rear shock absorber 12.

Here, the level of the damping force refers to an extent to which a valve of compression damping is opened. A lower level of the damping force indicates that the valve of compression damping is opened more widely than that indicated by a higher level of the damping force. In other embodiments, the total number of levels may be set to be two or more, such as level 1 to level 2, level 1 to level 3, or level 1 to level 5, etc., based on the actual needs.

In this embodiment, the controller 230 calculates a vibration parameter according to the vibration signal, so as to output the level control signal corresponding to the vibration parameter to the damping adjuster 240, such that the damping adjuster 240 adjusts the level of the damping force according to the level control signal. When the vibration parameter is higher, the level of the damping force is adjusted to be lower. When the vibration parameter is lower, the level of the damping force is adjusted to be higher.

Figure 18:
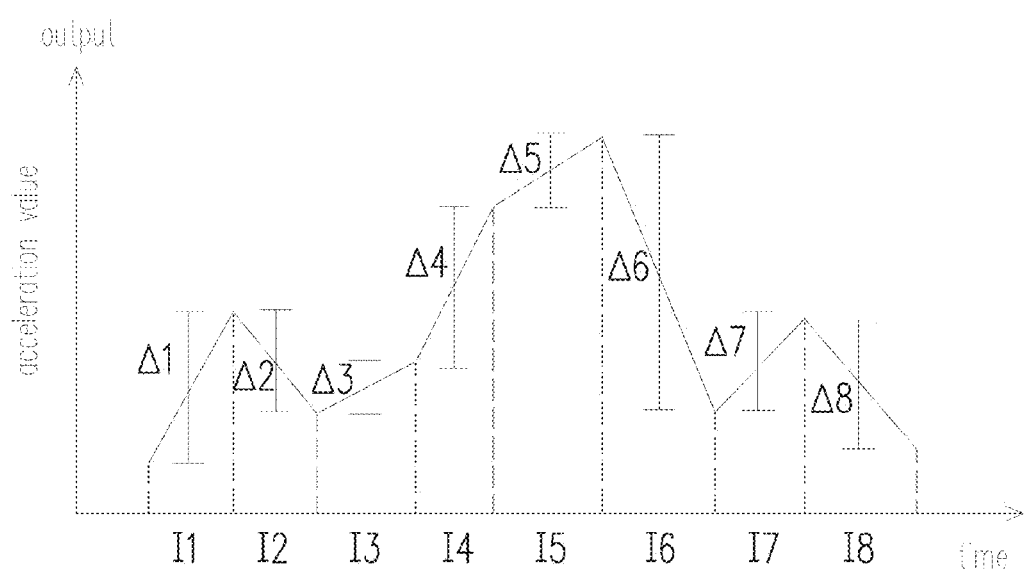
FIG. 18 is a schematic view illustrating a vibration signal according to the fifth embodiment.

FIG. 18 is a schematic view illustrating an example of a vibration signal. In a waveform of the vibration signal shown in FIG. 18, a cycle of time of each sampling is 0.01 seconds, and the number of times of sampling is 8. Accordingly, acceleration differences Δ1 to Δ8 of eight intervals (i.e. I1 to I8) are obtained. And the vibration parameter (indicated by "V" in the following) is calculated based on the following formula.

$$V = \sum_{i=1}^{N} \Delta i$$

Here, N refers the number of times of sampling for calculating the vibration parameter. Given that a predetermined time interval is 0.08 seconds, namely the vibration parameter is calculated every 0.08 seconds, the vibration parameter may be obtained by adding up the acceleration difference obtained in each sampling. Namely, V=Δ1+Δ2+Δ3+Δ4+Δ5+Δ6+Δ7+Δ8. However, it should be noted that the predetermined time interval of 0.08 seconds described herein only serves as an example, and the technology described herein is not limited thereto. In other embodiments, it is also possible to set the predetermined time interval to be one second (i.e. N=100). The predetermined time interval is not defined here.

After the controller 230 obtains the vibration parameter, the level of the damping force may be further determined according to the vibration parameter. In the following, how the level of the damping force is determined is described.

Figure 19:
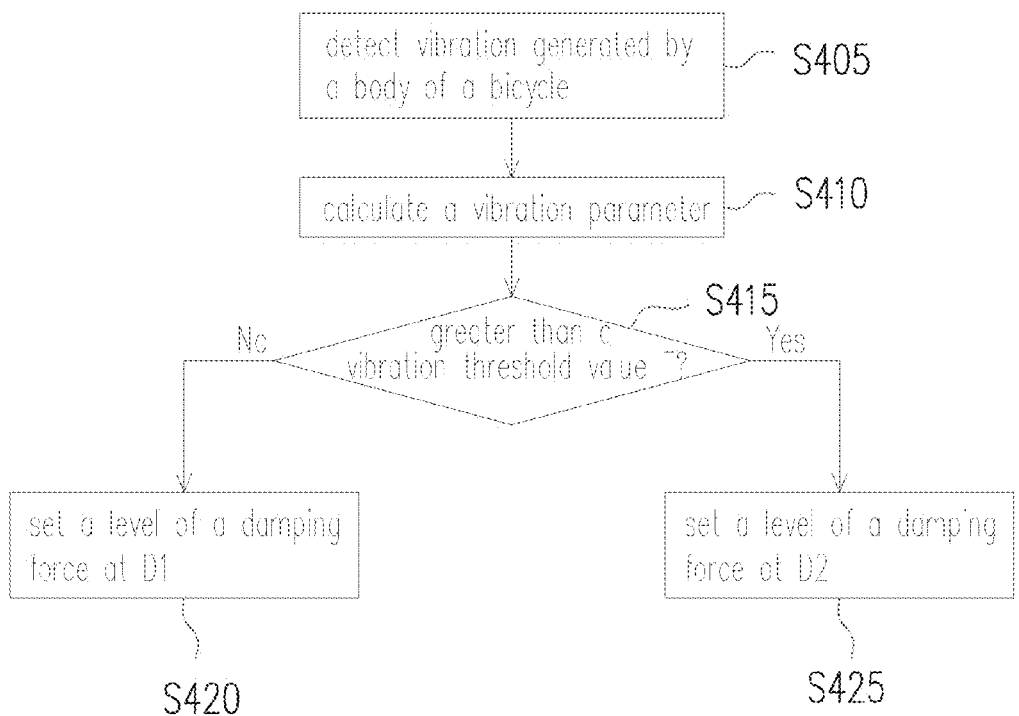
FIG. 19 is a flowchart illustrating an automatically adjusting damping method for a bicycle according to the fifth embodiment.

FIG. 19 is a flowchart illustrating an automatically adjusting damping method for a bicycle according to the fifth embodiment. Referring to FIGS. 17 and 19, at Step S405, the vibration sensor 1210 detects the vibration generated by the body of the bicycle, so as to output the vibration signal and transmit the vibration signal to the controller 230 through the signal receiver 220.

Then, at Step S410, the controller 230 calculates the vibration parameter based on the vibration signal. Calculation of the vibration parameter is referred to the description about FIG. 18 above. In addition, at Step S415, the controller 230 determines whether the vibration parameter is greater than a vibration threshold value T, so as to output the level control signal corresponding to the vibration parameter to the damping adjuster 240. If the vibration parameter is not greater than the vibration threshold value T, it is indicated that the bicycle 10 is on a smoother pavement, so the damping force may be increased. Thus, the controller 230 outputs the level control signal for increasing the level of the damping force to the damping adjuster 240. If the vibration parameter is greater than the threshold value T, it is indicated that the bicycle 10 is on a bumpy pavement, so the damping force may be decreased. Thus, the control processing signal 230 outputs the level control signal for decreasing the level of the damping force to the damping adjuster 240.

Here, if the vibration parameter is not greater than the vibration threshold value T, at Step S420, the damping adjuster 240 sets the level of the damping force at D1 (the first damping level). If the vibration parameter is greater than the vibration threshold value T, at Step S425, the damping adjuster 240 sets the level of the damping force at D2 (the second damping level). In addition, D1 is higher than D2.

Sixth Embodiment

Figure 20:
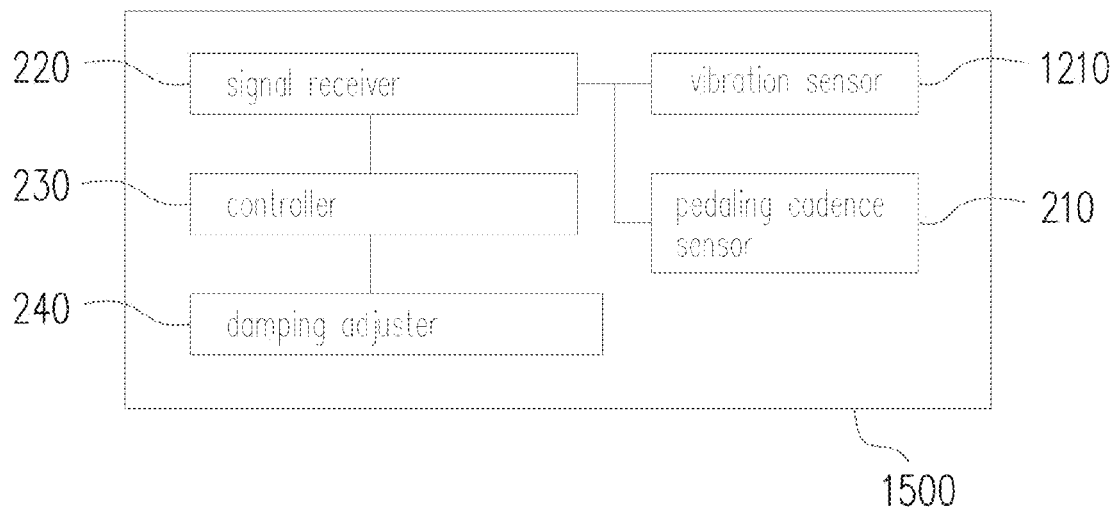
FIG. 20 is a block diagram illustrating an automatically adjusting damping system for a bicycle according to a sixth embodiment.

FIG. 20 is a block diagram illustrating an automatically adjusting damping system for a bicycle according to a second embodiment. An automatically adjusting damping system 1500 for a bicycle is an example of application of the automatically adjusting damping system 1200 for the bicycle. Here, components having the same functions as those in the automatically adjusting damping system 1200 for the bicycle are referred to with the same reference symbols, and the description of these components is omitted.

The automatically adjusting damping system 1500 for the bicycle includes the vibration sensor 1210, the signal receiver 220, the controller 230, the damping adjuster 240, and the pedaling cadence sensor 210. The pedaling cadence sensor 210 is coupled to the signal receiver 220 and is configured to detect a pedaling cadence of the bicycle 10 and output a pedaling signal. The pedaling cadence sensor 210 may be disposed at one of the chain ring 103, the crank spindle 104, the crank arm 105, the pedal 106, and the frame 100, etc., of the bicycle 10. In addition, the pedaling cadence sensor 510 may also be disposed at a leg, such as both legs (e.g. inner sides of thighs) of a rider, or on a shoe of the rider. The controller 230 determines an initial damping level according to the pedaling signal.

Figure 21:
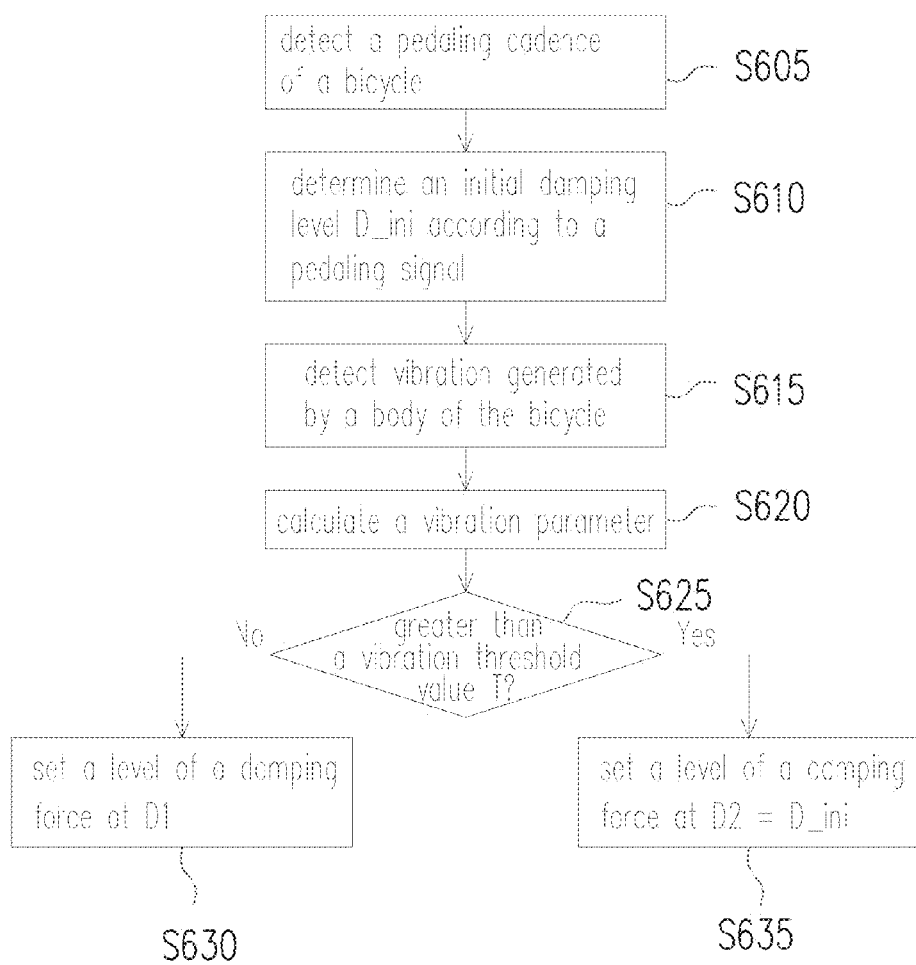
FIG. 21 is a flowchart illustrating an automatically adjusting damping method for a bicycle according to the sixth embodiment.

FIG. 21 is a flowchart illustrating an automatically adjusting damping method for a bicycle according to the sixth embodiment. Referring to FIGS. 20 and 21, at Step S605, the pedaling cadence of the bicycle 10 is detected by using the pedaling cadence sensor 210, and the pedaling signal is output.

Then, at Step S610, the controller 230 determines an initial damping level D_ini according to the pedaling signal. For example, two threshold values may be set to determine whether the pedaling cadence is in a high-speed state, a normal state, or a low-speed state. It is assumed that the threshold values are th1 and th2, and th2 is greater than th1. When the pedaling cadence is higher than th2, the state is determined to be the high-speed state, and the initial damping level D_ini is set at $D_{firm}$. When the pedaling cadence is lower than or equal to th2 and is higher than or equal to th1, the state is determined to be the normal state, and the initial damping level D_ini is set at $D_{medium}$. When the pedaling cadence is lower than th1, the state is determined to be the low-speed state, and the initial damping level D_ini is set at $D_{soft}$. In addition, $D_{firm} > D_{medium} > D_{soft}$.

After the initial damping level D_ini is determined, at Step S615, the vibration sensor 1210 detects the vibration generated by the body of the bicycle, so as to output the vibration signal and transmit the vibration signal to the controller 230 through the signal receiver 220. Then, at Step S620, the controller 230 calculates the vibration parameter based on the vibration signal. Calculation of the vibration parameter is referred to the description about FIG. 3 above. In addition, at Step S625, the controller 230 determines whether the vibration parameter is greater than the vibration threshold value T, so as to output the level control signal corresponding to the vibration parameter to the damping adjuster 240. If the vibration parameter is not greater than the vibration threshold value T, at Step S630, the damping adjuster 240 sets the level of the damping force at D1 (the first damping level). If the vibration parameter is greater than the vibration threshold value T, at Step S635, the damping adjuster 240 sets the level of the damping force at D2 (a second damping level, D2=D_ini). In addition, D1 is higher than D2.

Seventh Embodiment

Figure 22:
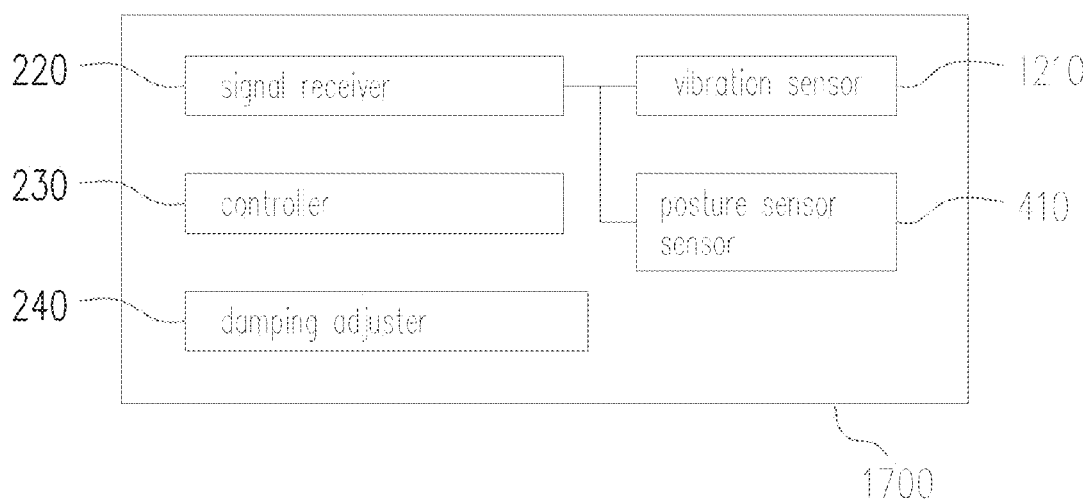
FIG. 22 is a block diagram illustrating an automatically adjusting damping system for a bicycle according to a seventh embodiment.

FIG. 22 is a block diagram illustrating an automatically adjusting damping system for a bicycle according to a third embodiment. An automatically adjusting damping system 1700 for a bicycle is an example of application of the automatically adjusting damping system 1200 for the bicycle. Here, components having the same functions as those in the automatically adjusting damping system 1200 for the bicycle are referred to with the same reference symbols, and the description of these components is omitted.

The automatically adjusting damping system 1700 for the bicycle includes the vibration sensor 1210, the signal receiver 220, the controller 230, the damping adjuster 240, and the posture sensor 410. The posture sensor 410 is configured to detect whether a posture that the rider adopts when riding the bicycle 10 is a standing pedaling posture or a sitting pedaling posture, and output a posture signal. The posture sensor 410 is coupled to the signal receiver 220, so as to transmit the posture signal to the controller 230 through the signal receiver 220, such that the controller 230 determines whether the vibration threshold value is T1 or T2 according to the posture signal.

The posture sensor 410 may be disposed on one of the saddle 107, the saddle post 108, the grip 110, the bicycle handle 112, the handle stem 111, the pedal 106, the frame 100, the front fork 101, the rear shock absorber 12, the hub 109, and the crank spindle 104, etc., of the bicycle 10, so as to obtain sensing data for determining a pedaling posture of the rider.

In the following, a pressure sensor serving as the posture sensor 410 is described as an example. The pressure sensor may be disposed inside the saddle 107 or the saddle post 108 to serve as the posture sensor 710. When the posture sensor 410 senses that a force is applied, the pedaling posture is the sitting pedaling posture, when the posture sensor 410 does not senses a force being applied, the pedaling posture is the standing pedaling posture. Alternatively, the pressure sensor may be disposed at each of the left and right pedals 106, the left and right grips 110, the bicycle handle 112, or the handle stem 111 (or any two points of the bicycle where forces are applied) to serve as the posture sensor 410. However, the posture sensor 410 is not limited thereto. The posture sensor 410 may also be an optical sensor or a radar, or other suitable sensors capable of sensing the change of center of gravity and posture of the rider.

In actual riding, the rider may prepare ahead in correspondence to pavement conditions and simultaneously change a manner of riding. For example, when there is an obstacle, the rider may stop pedaling to pass the obstacle at a lower speed (to reduce shaking of the body). During uphill riding, the rider may switch the pedaling posture to move the body forward and shift to a lighter gear to change the cadence. During cornering, the rider generally tends to lower the center of gravity and lower the pedaling cadence. Thus, two sets of parameters may be set in correspondence with the standing pedaling posture and the sitting pedaling posture, and each set of the parameters includes the vibration threshold value and two damping levels. In the set of parameters corresponding to the standing pedaling posture, the vibration threshold value is T1, and the damping levels are respectively D_11 and D_12. In the set of parameters corresponding to the sitting pedaling posture, the vibration threshold value is T2, and the damping levels are respectively D_13 and D_14. T1 and T2 described herein may be the same or different.

Figure 23:
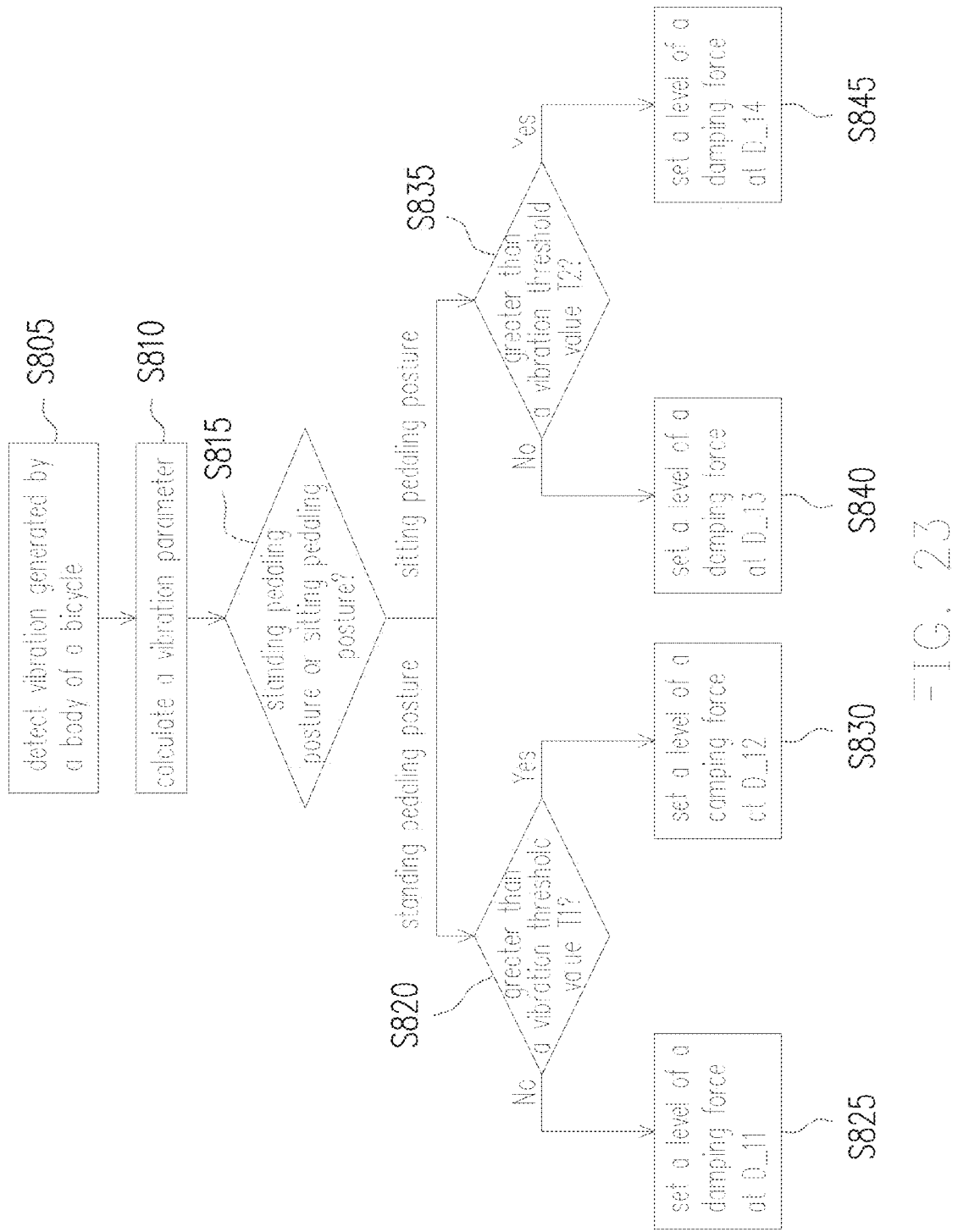
FIG. 23 is a flowchart illustrating an automatically adjusting damping method for a bicycle according to the seventh embodiment.

FIG. 23 is a flowchart illustrating an automatically adjusting damping method for a bicycle according to the third embodiment. Referring to FIGS. 22 and 23, at Step S805, the vibration sensor 1210 detects the vibration generated by the body of the bicycle 10, so as to output the vibration signal and transmit the vibration signal to the controller 230 through the signal receiver 220. Then, at Step S810, the controller 230 calculates the vibration parameter based on the vibration signal.

Then, at Step S815, the posture sensor 410 is used to detect whether the posture that the rider adopts when riding the bicycle 10 is the standing pedaling posture or the sitting pedaling posture, and output the corresponding posture signal, such that the controller 230 sets whether the vibration threshold value is T1 or T2 according to the posture signal. Step S815 may be performed before or together with Step S805. A sequence for performing Step S815 is not limited herein.

When it is determined to be the standing pedaling posture at Step S815, the controller 230 determines whether the vibration parameter is greater than the vibration threshold value T1 at Step S820. If the vibration parameter is not greater than the vibration threshold value T1, at Step S825, the damping adjuster 240 sets the level of the damping force at D_11 (the first damping level). If the vibration parameter is greater than the vibration threshold value T1, at Step S830, the damping adjuster 240 sets the level of the damping force at D_12 (the second damping level). In addition, D_11 is higher than D_12.

When the posture is determined to be the sitting pedaling posture at Step S815, the controller 230 determines whether the vibration parameter is greater than the vibration threshold value T2 at Step S835. If the vibration parameter is not greater than the vibration threshold value T2, at Step S840, the damping adjuster 240 sets the level of the damping force at D_13 (the third damping level). If the vibration parameter is greater than the vibration threshold value T2, at Step S845, the damping adjuster 240 sets the level of the damping force at D_14 (the fourth damping level). In addition, D_13 is higher than D_14. Also, since the center of gravity of the rider's body is less stable when the standing pedaling posture is adopted, the standing pedaling posture requires a higher damping level. Thus, it is preferred to simultaneously set that D_13<D_11, and D_14<D_12.

Eighth Embodiment

Figure 24:
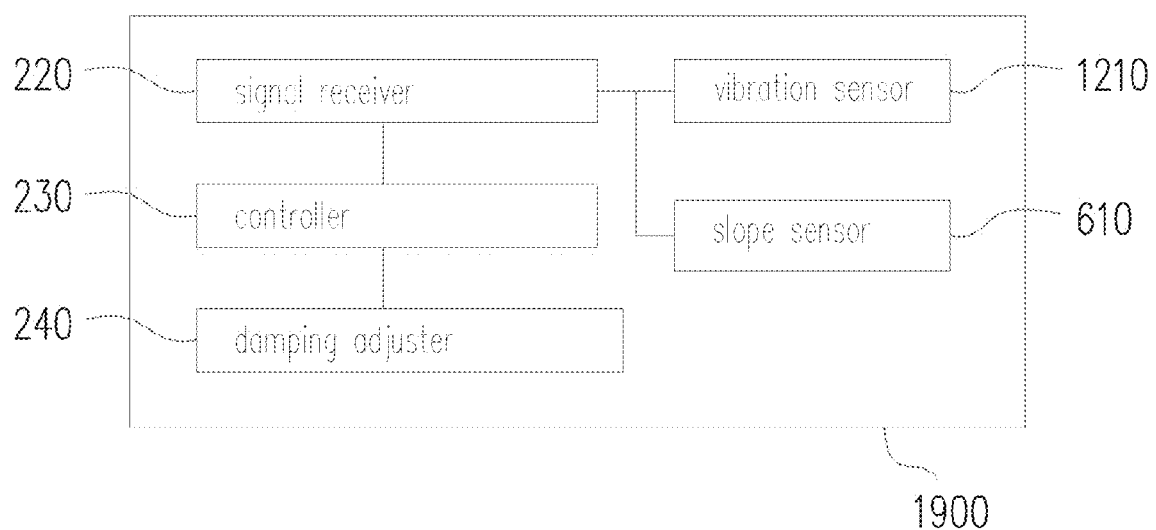
FIG. 24 is a block diagram illustrating an automatically adjusting damping system for a bicycle according to an eighth embodiment.

FIG. 24 is a block diagram illustrating an automatically adjusting damping system for a bicycle according to an eighth embodiment. An automatically adjusting damping system 1900 for a bicycle is an example of application of the automatically adjusting damping system 1200 for the bicycle. Here, components having the same functions as those in the automatically adjusting damping system 1200 for the bicycle are referred to with the same reference symbols, and the description of these components is omitted.

The automatically adjusting damping system 1900 for the bicycle includes the vibration sensor 1210, the signal receiver 220, the controller 230, the damping adjuster 240, and the slope sensor 610. The slope sensor 610 is configured to detect whether a slope of a current location of the bicycle 10 indicates uphill and output a corresponding slope signal to transmit the slope signal to the controller 230 through the signal receiver 220, such that the controller 230 sets whether the vibration threshold value is T3 or T4 according to the slope signal.

Figure 25:
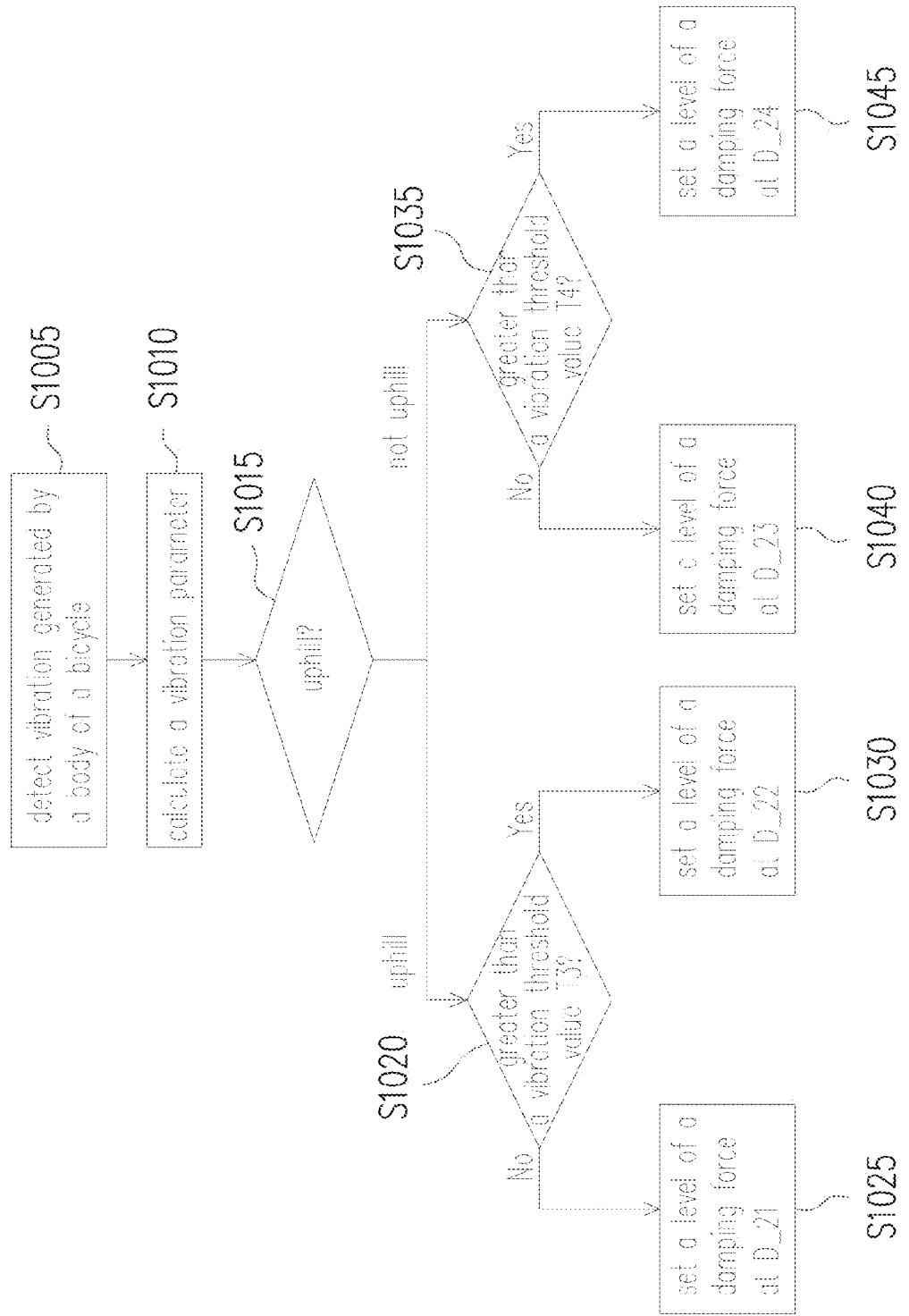
FIG. 25 is a flowchart illustrating an automatically adjusting damping method for a bicycle according to the eighth embodiment.

FIG. 25 is a flowchart illustrating an automatically adjusting damping method for a bicycle according to the eighth embodiment. Referring to FIGS. 24 and 25, at Step S1005, the vibration sensor 1210 detects the vibration generated by the body of the bicycle 10, so as to output the vibration signal and transmit the vibration signal to the controller 230 through the signal receiver 220. Then, at Step S1010, the controller 230 calculates the vibration parameter according to the vibration signal.

Then, at Step S1015, the slope sensor 610 is used to detect whether the slope of the location of the bicycle 10 indicates uphill, and output the corresponding slope signal, such that the controller 230 sets whether the vibration threshold value is T3 or T4 according to the slope signal. Step S1015 may be performed before or together with Step S1005. A sequence for performing Step S1015 is not limited herein. T3 and T4 described herein may be the same or different.

When the slope indicates uphill at Step S1015, the controller 230 determines whether the vibration parameter is greater than the vibration threshold value T3 at Step S1020. If the vibration parameter is not greater than the vibration threshold value T3, at Step S1025, the damping adjuster 240 sets the level of the damping force at D_21 (the first damping level). If the vibration parameter is greater than the vibration threshold value T3, at Step S1030, the damping adjuster 240 sets the level of the damping force at D_22 (the second damping level). In addition, D_21 is higher than D_22.

When the slope does not indicate uphill at Step S1015, the controller 230 determines whether the vibration parameter is greater than the vibration threshold value T4 at Step S1035. If the vibration parameter is not greater than the vibration threshold value T4, at Step S1040, the damping adjuster 240 sets the level of the damping force at D_23 (the third damping level). If the vibration parameter is greater than the vibration threshold value T4, at Step S1045, the damping adjuster 240 sets the level of the damping force at D_24 (the fourth damping level). In addition, D_23 is higher than D_24. It is preferred to also set that D_23<D_21, and D_24<D_22.

Ninth Embodiment

Figure 26:
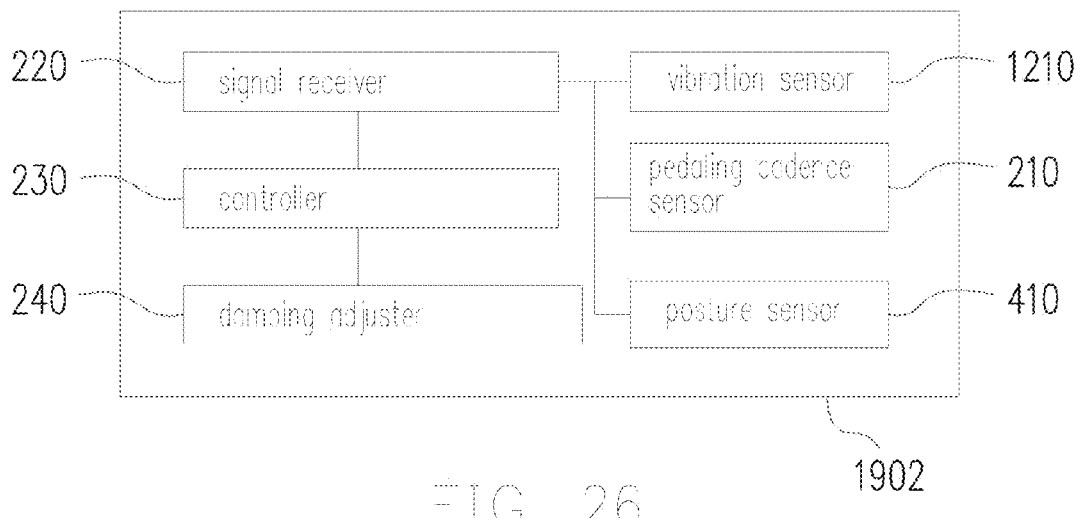
FIG. 26 is a block diagram illustrating an automatically adjusting damping system for a bicycle according to a ninth embodiment.

FIG. 26 is a block diagram illustrating an automatically adjusting damping system for a bicycle according to a ninth embodiment. An automatically adjusting damping system 1902 for a bicycle is an example of application of the automatically adjusting damping system 1200 for the bicycle. Here, components having the same functions as those described in the above embodiments are referred to with the same reference symbols, and description relevant to the components is omitted. The automatically adjusting damping system 1902 for the bicycle includes the vibration sensor 1210, the signal receiver 220, the controller 230, the damping adjuster 240, the pedaling cadence sensor 210, and the posture sensor 410.

Figure 27:
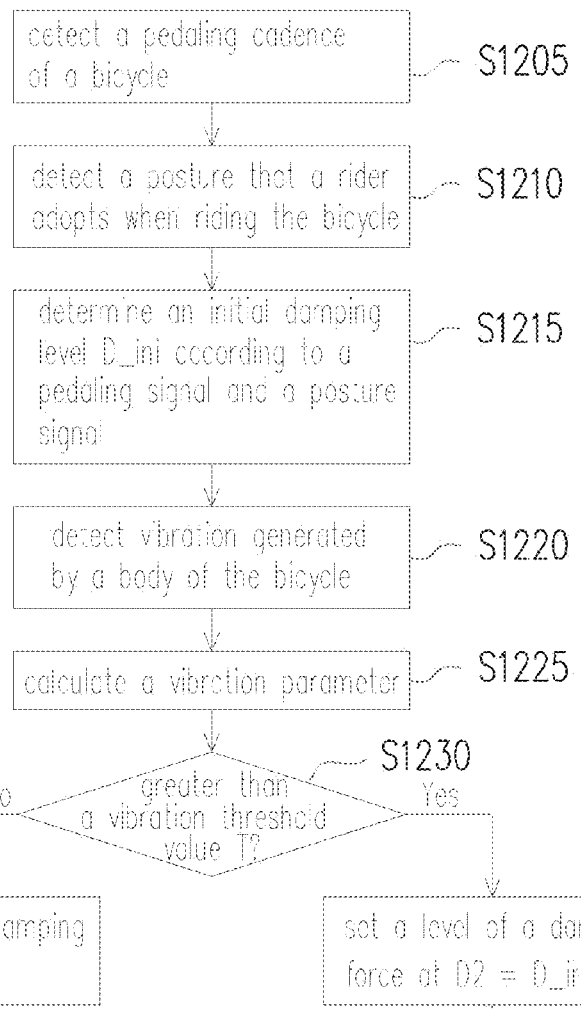
FIG. 27 is a flowchart illustrating an automatically adjusting damping method for a bicycle according to the ninth embodiment.

FIG. 27 is a flowchart illustrating an automatically adjusting damping method for a bicycle according to the ninth embodiment. Referring to FIGS. 26 and 27, at Step S1205, the pedaling cadence of the bicycle 10 is detected by using the pedaling cadence sensor 210, and the pedaling signal is output. Also, at Step S1210, the posture sensor 410 is used to detect whether the posture that the rider adopts when riding the bicycle is the standing pedaling posture or the sitting pedaling posture, and output the corresponding posture signal. Here, a sequence for performing Step S1205 and Step S1210 is not limited herein.

Then, at Step S1215, the controller 230 determines the initial damping level D_ini according to the pedaling signal and the posture signal. For example, different values are respectively set as the initial damping level D_ini according to postures when the pedaling cadence are in the high-speed state, the normal state, and the low-speed state.

Then, at Step S1220, the vibration sensor 1210 detects the vibration generated by the body of the bicycle 10. At Step S1225, the controller calculates the vibration parameter according to the vibration signal. Calculation of the vibration parameter is referred to the description above with respect to FIG. 18. In addition, at Step S1230, the controller 230 determines whether the vibration parameter is greater than the vibration threshold value T, so as to output the level control signal corresponding to the vibration parameter to the damping adjuster 240. If the vibration parameter is not greater than the vibration threshold value T, at Step S1235, the damping adjuster 240 sets the level of the damping force at D1 (the first damping level). If the vibration parameter is greater than the vibration threshold value T, at Step S1240, the damping adjuster 240 sets the level of the damping force at D2 (the second damping level), and D2=D_ini. In addition, D1 is higher than D2.

Tenth Embodiment

Figure 28:
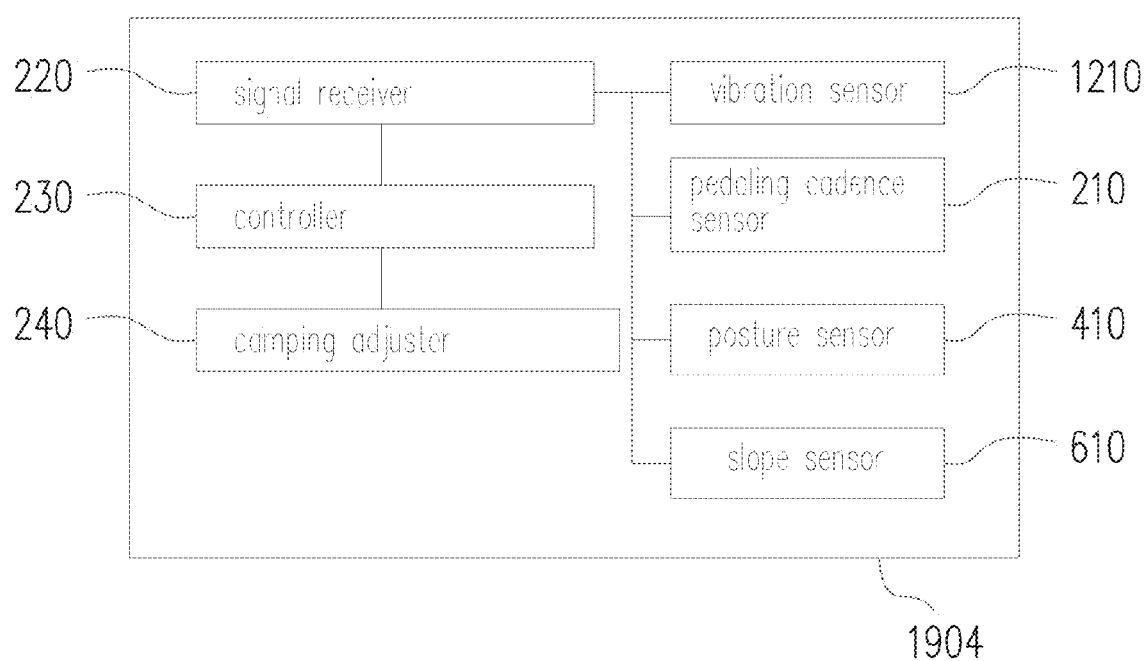
FIG. 28 is a block diagram illustrating an automatically adjusting damping system for a bicycle according to a tenth embodiment.

FIG. 28 is a block diagram illustrating an automatically adjusting damping system for a bicycle according to a tenth embodiment. An automatically adjusting damping system 1904 for a bicycle is an example of application of the automatically adjusting damping system 1200 for the bicycle. Here, components having the same functions as those described in the above embodiments are referred to with the same reference symbols, and description relevant to the components is omitted. The automatically adjusting damping system 1904 for the bicycle includes the vibration sensor 1210, the signal receiver 220, the controller 230, the damping adjuster 240, the pedaling cadence sensor 210, the posture sensor 410, and the slope sensor 610.

Figure 29:
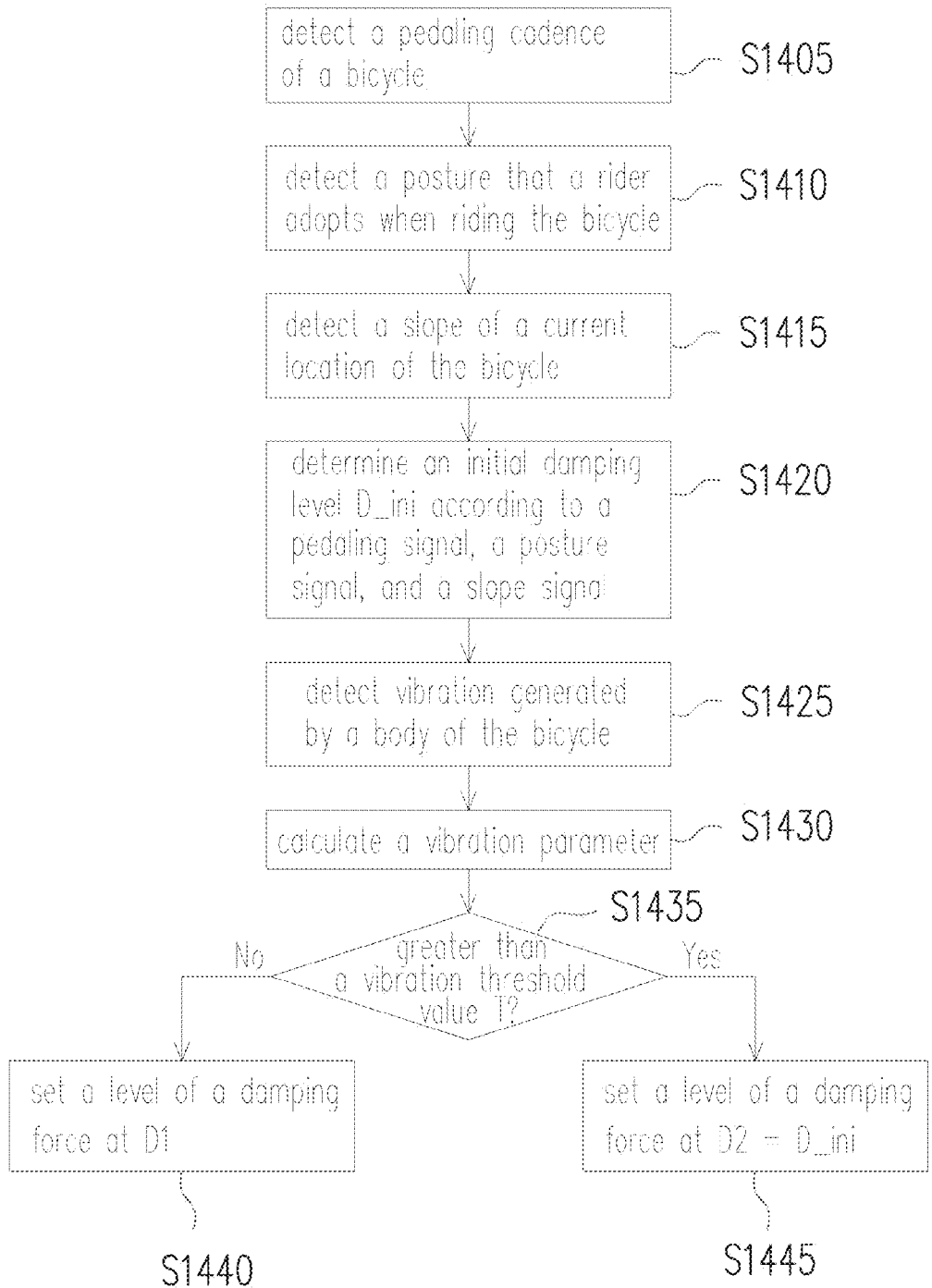
FIG. 29 is a flowchart illustrating an automatically adjusting damping method for a bicycle according to the tenth embodiment.

FIG. 29 is a flowchart illustrating an automatically adjusting damping method for a bicycle according to the tenth embodiment. Referring to FIGS. 28 and 29, at Step S1405, the pedaling cadence of the bicycle 10 is detected by using the pedaling cadence sensor 210, and the pedaling signal is output. Also, at Step S1410, the posture sensor 410 is used to detect whether the posture that the rider adopts when riding the bicycle 10 is the standing pedaling posture or the sitting pedaling posture, and output the corresponding posture signal. At Step 1415, the slope sensor 910 is used to detect whether the slope of the current location of the bicycle 10 indicates uphill, and output the corresponding slope signal. Here, a sequence for performing Step S1405, Step 1410, and Step 1415 is not limited herein.

Then, at Step S1420, the controller 230 determines the initial damping level D_ini according to the pedaling signal, the posture signal, and the slope signal. At Step S1425, the vibration sensor 1210 detects the vibration generated by the body of the bicycle 10. At Step S1430, the controller 230 calculates the vibration parameter according to the vibration signal. Calculation of the vibration parameter is referred to the description about FIG. 18 above. In addition, at Step S1435, the controller 230 determines whether the vibration parameter is greater than the vibration threshold value T, so as to output the level control signal corresponding to the vibration parameter to the damping adjuster 240. If the vibration parameter is not greater than the vibration threshold value T, at Step S1440, the damping adjuster 240 sets the level of the damping force at D1 (the first damping level). If the vibration parameter is greater than the vibration threshold value T, at Step S1445, the damping adjuster 240 sets the level of the damping force at D2 (the second damping level), and D2=D_ini. In addition, D1 is higher than D2.

Figure 30:
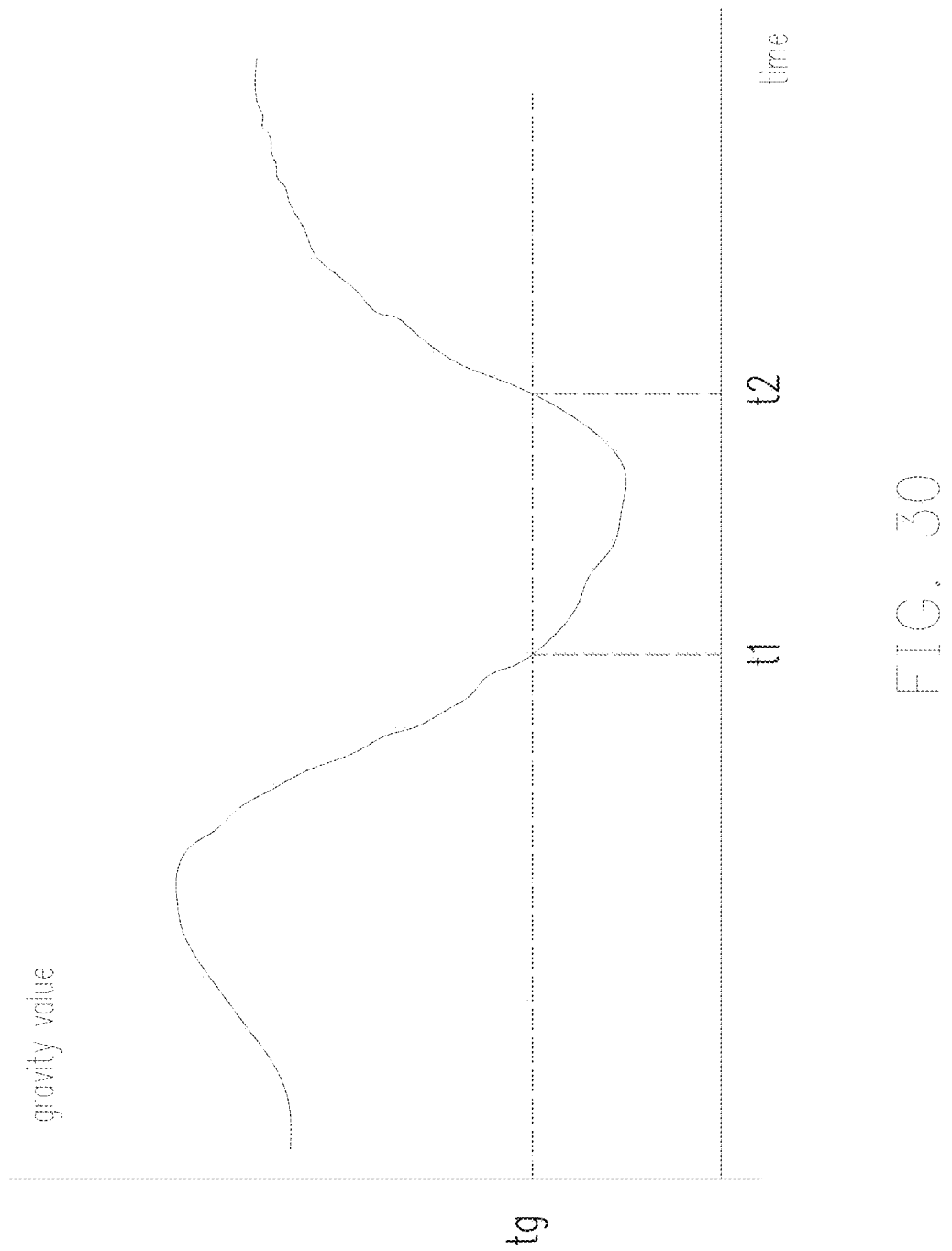
FIG. 30 is a curve diagram illustrating a curve of gravity value according to the tenth embodiment.

In addition, when the vibration sensor 1210 is a gravity sensor (g-sensor), the system may further set a threshold gravity value, so as to determine whether the bicycle is in a weightless state. When a gravity value sensed by the gravity sensor is lower than the threshold gravity value for a predetermined time tp, the controller 230 may automatically adjust the level of the damping force to the minimal damping level. FIG. 30 is a curve diagram illustrating an example curve of gravity value. In FIG. 20, when the controller 230 detects that a gravity value sensed by the gravity sensor from a time point t1 to a time point t2 is lower than a threshold gravity value tg, and a time interval (t2−t1) from between the time point t1 and the time point t2 exceeds a the predetermined time tp, it is determined that the bicycle is in the weightless state during the time interval (t2−t1). Therefore, the controller 230 may make the damping adjuster 240 set the level of the damping force at the minimal damping level. For example, the controller 230 may drive the valve of compression damping to be fully open.

Figure 31:
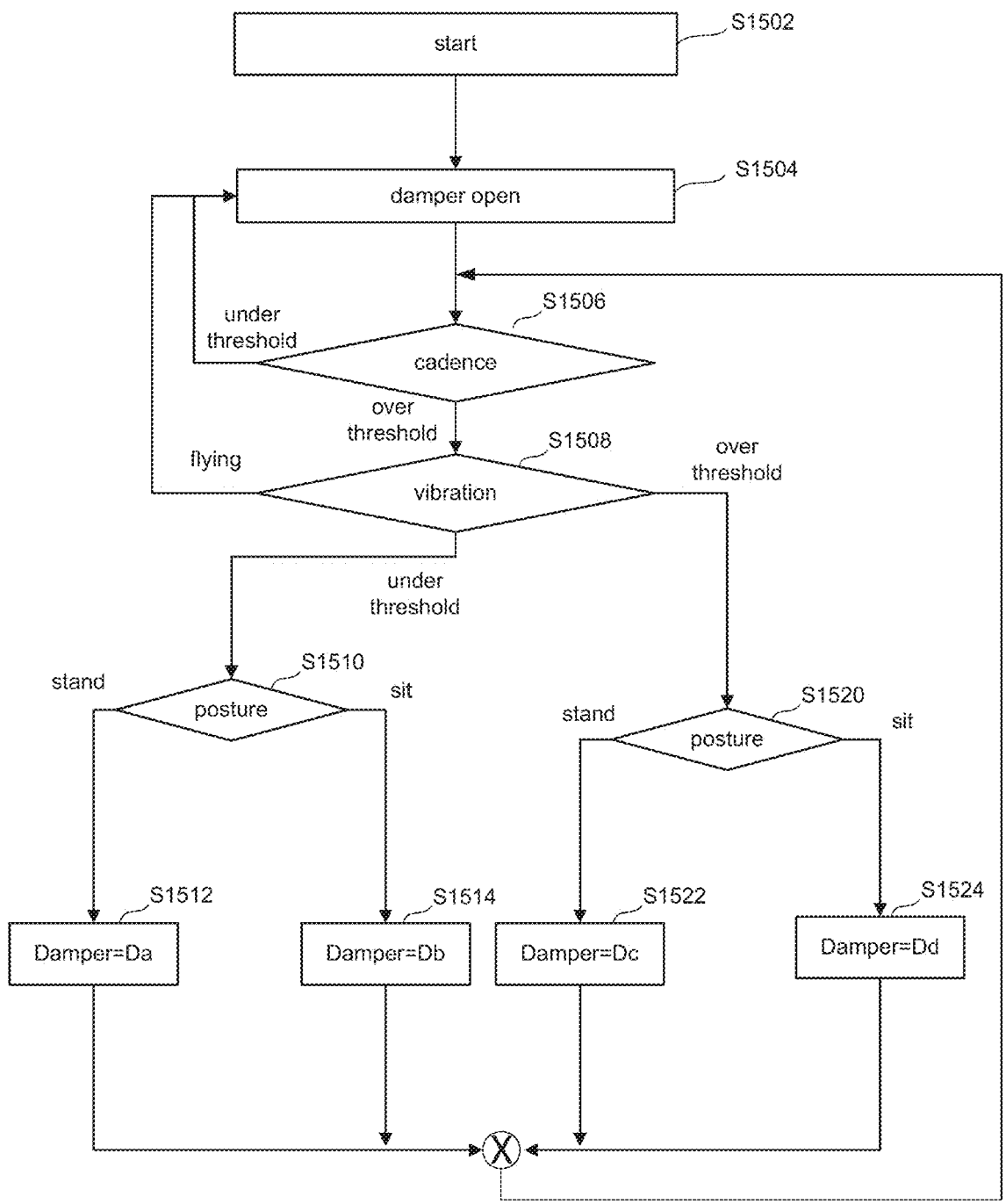
FIG. 31 is a flow chart describing one embodiment of a process for automatically adjusting the damper of a shock system based on cadence, vibration and posture.

FIG. 31 is a flow chart describing one embodiment of a process for automatically adjusting the damper of a shock system based on cadence, vibration and posture. The flow chart of FIG. 31 applies to the embodiment of FIG. 26; however, the flow chart of FIG. 31 can apply to other embodiment of structure. In step S1502, the process starts. In S1504, the damper for the shock absorber is open. In one example, the damper is completely open. In another example, the damper is open to the softest setting. In step S1506, the data from the cadence sensor 210 is received and analyzed. If the signal from the cadence sensor 210 is below (or equal to) a threshold, then the process is complete, the damper stay open and the method loops back to step S1504. If the signal from the cadence sensor 210 is greater the threshold, then the data from vibration sensor 1210 is considered in step S1508. If the vibration sensor indicates that the bicycle is flying (ie in a weightless state), then the process is complete, the damper stay open and the method loops back to step S1504. If the data from vibration sensor does not indicate that the bicycle is flying and the data from vibration sensor is less than or equal to a threshold, then data from posture sensor 410 is considered in step S1510. If the data from vibration sensor does not indicate that the bicycle is flying and the data from vibration sensor is greater than a threshold, then data from posture sensor 410 is considered in step S1520.

In step S1510, it is determined whether data from posture sensor 410 indicates that the rider is sitting or standing. If the rider is standing, then the Damper is set to a value of Da in step S1512. If the rider is sitting, then the Damper is set to a value of Db in step S1514.

In step S1520, it is determined whether data from posture sensor 410 indicates that the rider is sitting or standing. If the rider is standing, then the Damper is set to a value of Dc in step S1522. If the rider is sitting, then the Damper is set to a value of Dd in step S1524. Note that (Da≥Db) AND (Dc≥Dd) AND (Da≥Dc) AND (Db≥Dd).

In view of the foregoing, the vibration sensor is disposed on the bicycle to detect the shock from the pavement to the body of the bicycle. In addition, the controller is also disposed on the bicycle to calculate the vibration of the body of the bicycle according to the shock of the body of the bicycle and logically determine whether to increase or decrease the level of the damping force. Thus, on the smooth pavement, the pedaling efficiency may be increased, so that the power exerted by the rider may be transmitted to the bicycle in a more effective way. And on the bumpy pavement, the comfort and control may be increased, so as to improve the safety of riding. Moreover, since switching of the level of the damping force of the damper is automatically and logically determined, the rider does not need to pay attention to manually control the switching. Therefore, the convenience and the safety are both improved.

The foregoing detailed description has been presented for purposes of illustration and description. It is not intended to be exhaustive or limiting to the precise form disclosed. Many modifications and variations are possible in light of the above teaching. The described embodiments were chosen in order to best explain the principles of the disclosed technology and its practical application, to thereby enable others skilled in the art to best utilize the technology in various embodiments and with various modifications as are suited to the particular use contemplated. It is intended that the scope be defined by the claims appended hereto.

What is claimed is:

1. An automatic control shock absorber system for a bicycle, comprising:
    a pedaling cadence sensor, the pedaling cadence sensor is configured to detect pedaling cadence for the bicycle and output a pedaling signal based on the detected pedaling cadence; and
    a controller in communication with the pedaling cadence sensor, the controller adjusts a damping force of the shock absorber system based at least on the pedaling signal, the controller adjusts the damping force based on a relational curve of damping that has the damping force increase in a stepwise manner as pedaling cadence increases.

2. The automatic control shock absorber system of claim 1, further comprising:
    a signal receiver coupled to the pedaling cadence sensor to receive the pedaling signal, the pedaling cadence sensor detects a pedaling cadence of the bicycle, the controller is coupled to the signal receiver to receive the pedaling signal and output a level control signal according to the pedaling signal; and
    a damping adjuster coupled to the controller, the damping adjuster adjusts a level of the damping force according to the level control signal.

3. The automatic control shock absorber system of claim 1, wherein:
    the bicycle comprises a front fork shock absorber and a rear shock absorber, each of the front fork shock absorber and the rear shock absorber comprises a separate damping adjuster, the controller individually controls the damping adjuster of the front fork shock absorber and the rear shock absorber.

4. The automatic control shock absorber system of claim 1, further comprising:
a posture sensor in communication with the controller, the posture sensor is configured to detect a posture of a rider when riding the bicycle and outputting a posture signal, the controller adjusts the damping force of the shock absorber system based on the pedaling signal and the posture signal.

5. The automatic control shock absorber system of claim 4, wherein:
the posture sensor is adapted to sense a first posture and a second posture, the first posture is associated with a first relational curve of damping, the second posture is associated with a second relational curve of damping; and
the controller uses the first relational curve of damping based on the pedaling signal in response to the posture sensor sensing the first posture and the controller uses the second relational curve of damping based on the pedaling signal in response to the posture sensor sensing the second posture.

6. The automatic control shock absorber system of claim 1, further comprising:
a slope sensor, the slope sensor is configured to detect a slope of a location of the bicycle and outputs a slope signal, the controller adjusts the damping force of the shock absorber system based on the pedaling signal and the slope signal.

7. The automatic control shock absorber system of claim 1, further comprising:
a slope sensor, the slope sensor is configured to detect a slope of a location of the bicycle and outputs a slope signal; and
a posture sensor in communication with the controller, the posture sensor is configured to detect a posture of a rider when riding the bicycle and outputting a posture signal, the controller adjusts the damping force of the shock absorber system based on the pedaling signal, the posture signal and the slope signal.

8. An automatic control shock absorber system for a bicycle, comprising:
a pedaling cadence sensor, the pedaling cadence sensor is configured to detect pedaling cadence for the bicycle and output a pedaling signal based on the detected pedaling cadence; and
a controller in communication with the pedaling cadence sensor, the controller adjusts a damping force of the shock absorber system based at least on the pedaling signal, the controller adjusts the damping force based on a relational curve of damping that has the damping force positively correlated with pedaling cadence such that as the pedaling cadence increases then the damping force increases linearly.

9. An automatic control shock absorber system for a bicycle, comprising:
a posture sensor in communication with the controller, the posture sensor is configured to detect a posture of a rider when riding the bicycle and outputting a posture signal; and
a controller in communication with the posture sensor, the controller adjusts a damping force of the shock absorber system based at least on the posture signal.

10. The automatic control shock absorber system of claim 9, further comprising:
a signal receiver coupled to the posture to receive the posture signal, the controller is coupled to the signal receiver to receive the posture signal and output a level control signal according to the posture signal; and
a damping adjuster coupled to the controller, the damping adjuster adjusts a level of the damping force according to the level control signal.

11. A method for automatically controlling a shock absorber system for a bicycle, comprising:
automatically sensing a pedaling cadence for the bicycle;
detecting a posture of a rider when riding the bicycle; and
automatically adjusting a damping force of the shock absorber system based at least on the pedaling cadence and the posture.

12. The method of claim 11, further comprising:
detecting a slope of a location of the bicycle, the automatically adjusting the damping force includes adjusting the damping force based on the pedaling cadence, the posture and the slope of the location of the bicycle.

13. An automatic control shock absorber system for a bicycle, comprising:
a vibration sensor, the vibration sensor is configured to detect vibration of the bicycle and output a vibration signal;
a signal receiver coupled to the vibration sensor to receive the vibration signal;
a controller coupled to the signal receiver to receive the vibration signal and output a level control signal according to the vibration signal, the controller adjusts a damping force of the shock absorber system via the level control signal based at least on the vibration signal;
a damping adjuster coupled to the controller, the damping adjuster adjusts the level of the damping force of the shock absorber system according to the level control signal.

14. The automatic control shock absorber system of claim 13, further comprising:
a posture sensor in communication with the controller, the posture sensor is configured to detect a posture of a rider when riding the bicycle and outputting a posture signal, the controller adjusts the damping force of the shock absorber system based on the vibration signal and the posture signal.

15. The automatic control shock absorber system of claim 13, further comprising:
a slope sensor, the slope sensor is configured to detect a slope of a location of the bicycle and outputs a slope signal, the controller adjusts the damping force of the shock absorber system based on the vibration signal and the slope signal.

16. The automatic control shock absorber system of claim 13, further comprising:
a pedaling cadence sensor, the pedaling cadence sensor is configured to detect pedaling cadence for the bicycle and output a pedaling signal based on the detected pedaling cadence, the controller adjusts the damping force of the shock absorber system based on the vibration signal and the pedaling signal.

17. The automatic control shock absorber system of claim 13, further comprising:
a pedaling cadence sensor, the pedaling cadence sensor is configured to detect pedaling cadence for the bicycle and output a pedaling signal based on the detected pedaling cadence;
a slope sensor, the slope sensor is configured to detect a slope of a location of the bicycle and outputs a slope signal; and a posture sensor in communication with the controller, the posture sensor is configured to detect a posture of a rider when riding the bicycle and outputting a posture signal, the controller adjusts the damping force of the shock absorber system based on the vibration signal, the pedaling signal, the slope signal and the posture signal.

18. The automatic control shock absorber system of claim 13, further comprising:
a pedaling cadence sensor, the pedaling cadence sensor is configured to detect pedaling cadence for the bicycle and output a pedaling signal based on the detected pedaling cadence; and
a posture sensor in communication with the controller, the posture sensor is configured to detect a posture of a rider when riding the bicycle and outputting a posture signal, the controller adjusts the damping force of the shock absorber system based on the vibration signal, the pedaling signal and the posture signal.

19. The automatic control shock absorber system of claim 18, wherein:
wherein the controller determines an initial damping level according to the pedaling signal and the posture signal and determines whether the vibration parameter is greater than a vibration threshold value, and when the vibration parameter is not greater than the vibration threshold value the damping force is set at a first damping level, while when the vibration parameter is greater than the vibration threshold value then the damping force is set at a second damping level, the first damping level being higher than the second damping level, and the second damping level being the initial damping level.

20. The automatic control shock absorber system of claim 13, wherein:
the controller calculates a vibration parameter within a predetermined time interval according to the vibration signal, and when the vibration parameter is higher the level of the damping force is adjusted to be lower, while when the vibration parameter is lower the level of the damping force is adjusted to be higher.

21. An automatic control shock absorber system for a bicycle, comprising:
a vibration sensor, the vibration sensor is configured to detect vibration of the bicycle and output a vibration signal; and
a controller in communication with the vibration sensor, the controller adjusts a damping force of the shock absorber system based at least on the vibration signal;
the vibration sensor is a gravity sensor, and a threshold gravity value is set, wherein when a gravity value sensed by the gravity sensor is lower than the threshold gravity value for a predetermined time, the controller causes adjustment of the damping force to a minimal damping level.

22. A method for automatically controlling a shock absorber system for a bicycle, comprising:
automatically detecting vibration of the bicycle;
automatically detecting a posture of a rider when riding the bicycle; and
automatically adjusting a damping force of the shock absorber system based at least on the vibration of the bicycle and the posture.

23. The method of claim 22, further comprising:
automatically sensing a pedaling cadence for the bicycle, the automatically adjusting the damping force includes adjusting the damping force based on the vibration of the bicycle, the posture and the pedaling cadence.

* * * * *